(12) United States Patent
Kashima

(10) Patent No.: US 7,405,786 B2
(45) Date of Patent: *Jul. 29, 2008

(54) LAMINATED RETARDATION OPTICAL ELEMENT, PROCESS OF PRODUCING THE SAME, AND LIQUID CRYSTAL DISPLAY

(75) Inventor: Keiji Kashima, Tokyo (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/896,258

(22) Filed: Aug. 30, 2007

(65) Prior Publication Data

US 2007/0296892 A1   Dec. 27, 2007

Related U.S. Application Data

(63) Continuation of application No. 10/655,582, filed on Sep. 5, 2003, now Pat. No. 7,324,180.

(30) Foreign Application Priority Data

Sep. 6, 2002   (JP)   ............... 2002-261717

(51) Int. Cl.
*G02F 1/1335* (2006.01)
*G02F 1/1337* (2006.01)
(52) U.S. Cl. .................. 349/117; 349/119; 349/130
(58) Field of Classification Search ................. 349/117, 349/119, 130, 129, 120
See application file for complete search history.

(56) References Cited

U.S. PATENT DOCUMENTS 5,403,510 A    4/1995    Kajiyama et al.

(Continued)

FOREIGN PATENT DOCUMENTS

JP    A-57-165480    10/1982

(Continued)

OTHER PUBLICATIONS

Y. Iwamoto et al., "35.3: Improvement of Transmitted Light Efficiency in SH-LCDs Using Quarter-Wave Retardation Films", SID '00 Digest of Tech. Papers (2000), pp. 902-905.

*Primary Examiner*—Mike Qi
(74) *Attorney, Agent, or Firm*—Oliff & Berridge, PLC

(57) ABSTRACT

In a liquid crystal display 90, a laminated retardation optical element 10 is placed between a polarizer 102A on the incident side and a liquid crystal cell 104, and a ~/4 retardation film 102C 10 is placed between a polarizer 102B on the emergent side and the liquid crystal cell 104. The laminated retardation optical element 10 comprises: a ~/4 retardation layer 14 having the function of bringing, to light that passes through this retardation layer, a 15 phase difference corresponding to a quarter of the wavelength of the light; and a C plate-type retardation layer 16 that acts as a negative C plate. The ~/4 retardation layer 14 and the C plate-type retardation layer 16 are laminated to a transparent substrate 12 in 20 the order mentioned, and are optically bonded to each other. The l/4 retardation layer 14 comprises as its main component a horizontally-aligned, cross-linked nematic liquid crystal, while the C plate-type retardation layer 16 comprises as its main component a 25 cross-linked chiral nematic liquid crystal (a cross-linked nematic liquid crystal and a cross-linked chiral agent) or cross-linked discotic liquid crystal.

14 Claims, 10 Drawing Sheets

U.S. PATENT DOCUMENTS

| | | | |
|---|---|---|---|
| 5,504,603 | A | 4/1996 | Winker et al. |
| 5,895,106 | A * | 4/1999 | VanderPloeg et al. ........ 349/120 |
| 6,421,107 | B1 | 7/2002 | Greenfield et al. |
| 6,646,701 | B2 | 11/2003 | Lyu et al. |
| 2004/0051831 | A1 | 3/2004 | Su Yu et al. |
| 2004/0095532 | A1 | 5/2004 | Parri et al. |
| 2004/0233362 | A1 * | 11/2004 | Kashima ..................... 349/117 |
| 2005/0151896 | A1 | 7/2005 | Hara et al. |

FOREIGN PATENT DOCUMENTS

| | | |
|---|---|---|
| JP | A-3-67219 | 3/1991 |
| JP | A-4-322223 | 11/1992 |
| JP | A-7-258638 | 10/1995 |
| JP | A-10-68816 | 3/1998 |
| JP | A-10-227998 | 8/1998 |
| JP | A-10-508882 | 9/1998 |
| JP | A-10-312166 | 11/1998 |
| JP | A-11-258605 | 9/1999 |
| JP | A-2000-35570 | 2/2000 |
| JP | A-2001-56484 | 2/2001 |
| JP | A-2002-40428 | 2/2002 |
| JP | A-2002-055342 | 2/2002 |
| JP | A-2003-015134 | 1/2003 |
| JP | A-2003-139941 | 5/2003 |
| JP | A-2003-167126 | 6/2003 |
| JP | A-2003-185827 | 7/2003 |
| JP | A-2003-207641 | 7/2003 |
| JP | A-2004-110003 | 4/2004 |
| WO | WO 01/20393 | 3/2001 |

* cited by examiner

LAMINATED RETARDATION OPTICAL ELEMENT, PROCESS OF PRODUCING THE SAME, AND LIQUID CRYSTAL DISPLAY

This is a Continuation of U.S. patent application Ser. No. 10/655,582 filed on Sep. 5, 2003 now U.S. Pat. No. 7,324,180, which claims priority to Japan Patent Application No. 2002-261717, filed on Sep. 6, 2002. The entire disclosure of the prior application is hereby incorporated by reference herein in their entirety.

BACKGROUND OF THE INVENTION

1. Field of the Invention

The present invention relates to a laminated retardation optical element for use in a liquid crystal display or the like, especially a laminated retardation optical element having the function of effectively compensating for the viewing angle dependency of the optical properties of a liquid crystal cell (liquid crystal layer), being in the form of a thin film, and capable of effectively preventing lowering of contrast that is caused by interfacial reflection. The present invention also relates to a process of producing the same, and to a liquid crystal display comprising the laminated retardation optical element.

2. Description of Related Art

FIG. 12 is an exploded, diagrammatic perspective view of a conventional, standard liquid crystal display.

As shown in FIG. 12, the conventional liquid crystal display 100 comprises a polarizer 102A on the incident side, a polarizer 102B on the emergent side, and a liquid crystal cell 104.

Of these component parts, the polarizers 102A and 102B are so constructed that they selectively transmit only linearly polarized light having a plane of vibration in a predetermined direction, and are arranged in the cross nicol disposition so that the direction of vibration of linearly polarized light which the polarizer 102A transmits is perpendicular to that of vibration of linearly polarized light which the polarizer 102B transmits. The liquid crystal cell 104 comprises a large number of cells corresponding to pixels, and is placed between the polarizers 102A and 102B.

The case where the liquid crystal cell 104 in the above-described liquid crystal display 100 is of VA (Vertical Alignment) mode, which a nematic liquid crystal having negative dielectric anisotropy is sealed in a liquid crystal cell (in the figure, the directors of liquid crystalline molecules are indicated by dotted lines), is now taken as an example. Linearly polarized light that has passed through the polarizer 102A on the incident side, passes, without undergoing phase shift, through those cells in the liquid crystal cell 104 that are in the non-driven state, and is blocked by the polarizer 102B on the emergent side. On the contrary, the linearly polarized light undergoes phase shift when it passes through those cells in the liquid crystal cell 104 that are in the driven state, and the light in an amount corresponding to the amount of this phase shift passes through and emerges from the polarizer 102B on the emergent side. It is therefore possible to display the desired image on the emergent-side polarizer 102B side by properly controlling the driving voltage that is applied to each cell in the liquid crystal cell 104. The liquid crystal display 100 is not limited to the above embodiment in which light is transmitted and blocked in the above-described manner, and there is also a liquid crystal display so constructed that light emerging from those cells in the liquid crystal cell 104 that are in the non-driven state passes through and emerges from the polarizer 102B on the emergent side, and that light emerging from those cells that are in the driven state is blocked by the polarizer 102B on the emergent side.

Discussion is now made on the case where linearly polarized light passes, through the non-driven-state cells in the above-described liquid crystal cell 104 of VA mode. The liquid crystal cell 104 is birefringent, and its refractive index in the direction of thickness and that in the direction of plane are different from each other. Therefore, of the linearly polarized light that passed through the polarizer 102A on the incident side, the light that has entered the liquid crystal cell 104 along the normal to it passes through the liquid crystal cell 104 without undergoing phase shift, but the light that has slantingly entered the liquid crystal cell 104 from the direction deviating from the normal to it undergoes phase shift while it passes through the liquid crystal cell 104, and becomes elliptically polarized light. The cause of this phenomenon is that those liquid crystalline molecules that are vertically aligned in the liquid crystal cell 104 act as a positive C plate when the cells in the liquid crystal cell 104 of VA mode are in the non-driven state. It is noted that the amount of phase shift which light passing through the liquid crystal cell 104 (transmitted light) undergoes is affected also by the double refractive value of the liquid crystalline molecules sealed in the liquid crystal cell 104, the thickness of the liquid crystal cell 104, the wavelength of the transmitted light, and so on.

Owing to the above-described phenomenon, even when the cells in the liquid crystal cell 104 are in the non-driven state and linearly polarized light is supposed to be transmitted as it is and blocked by the polarizer 102B on the emergent side, part of the light that has emerged slantingly from the liquid crystal cell 104 in the direction deviating from the normal to it is to leak from the polarizer 102B on the emergent side.

For this reason, the above-described conventional liquid crystal display 100 has the problem (viewing angle dependency problem) that the image quality at the time when an image is viewed slantingly from a position not on the normal to the liquid crystal cell 104 is apt to be inferior to that at the time when the image is viewed from the front of the display.

To eliminate the viewing angle dependency problem with the aforementioned conventional liquid crystal display 100, there have been developed a variety of techniques up to now. One of them is a liquid crystal display as described, for example, in Patent Document 1 listed below. This liquid crystal display uses a retardation optical element comprising a retardation layer having a cholesteric structure (a retardation layer having double refractivity), where the retardation optical element is placed between a liquid crystal cell and a polarizer in order to provide optical compensation.

In the retardation optical element having a cholesteric structure, the selective reflection wavelength given by the equation of "$\lambda = nav \cdot p$" (p: the helical pitch in the helical structure consisting of liquid crystalline molecules; and nav: the mean refractive index of a plane perpendicular to the helical axis) is controlled to be either shorter or longer than the wavelength of transmitted light, as described, for example, in Patent Document 2 listed below.

Further, as described, for example, in Patent Document 3 listed below, a liquid crystal display using a retardation optical element comprising a retardation layer (a retardation layer having double refractivity) made from a discotic liquid crystal, has also been known as another technique of eliminating the above-described viewing angle dependency problem. In this liquid crystal display, the retardation optical element is placed between a liquid crystal cell and a polarizer in order to provide optical compensation.

In these retardation optical elements, linearly polarized light that has slantingly entered the retardation layer from the direction deviating from the normal to it undergoes phase shift, while passing through this retardation layer, to become elliptically polarized light, as in the case of the above-described liquid crystal cell of VA mode. The cause of this phenomenon is that a cholesteric or discotic liquid crystal acts as a negative C plate. The amount of phase shift which light passing through the retardation layer (transmitted light) undergoes is affected also by the double refractive value of the liquid crystalline molecules in the retardation layer, the thickness of the retardation layer, the wavelength of the transmitted light, and so on.

It is therefore possible to eliminate, to a considerable extent, the viewing angle dependency problem with conventional liquid crystal displays by the use of the above-described retardation optical element, if the retardation layer contained in the retardation optical element is properly designed so that a phase difference brought by a liquid crystal cell of VA mode that acts as a positive C plate and a phase difference brought by the retardation layer acting as a negative C plate, contained in the retardation optical element, are canceled each other.

It is noted that it is possible to eliminate the viewing angle dependency problem with liquid crystal displays to a more considerable extent by the combination use of a retardation layer that acts as a negative C plate (i.e., a retardation layer whose refractive indices Nx and Ny in the direction of plane and Nz in the direction of thickness are in the relationship Nx=Ny>Nz) and a retardation layer that acts as an A plate (i.e., a retardation layer whose refractive indices Nx and Ny in the direction of plane and Nz in the direction of thickness are in the relationship Nx>Ny=Nz), as described in Patent Document 4 as listed below, for example.

In the meantime, the above-described liquid crystal displays comprising liquid crystal cells of VA mode encompass a liquid crystal display comprising a liquid crystal cell of so-called multi-domain VA mode in which liquid crystalline molecules are inclined in two or more different directions when an electric field is applied. In such a liquid crystal display, it has been known that, if light that enters the liquid crystal cell of multi-domain VA mode is linearly polarized one, light transmission is decreased, but that, if light that enters the liquid crystal cell has been converted to circularly polarized light by a λ/4 retardation film, decrease in light transmission can be effectively prevented (the following Patent Document 5 and Non-Patent Document 1).

However, in the liquid crystal display as described in Patent Document 5 or Non-Patent Document 1, although it is possible to prevent decrease in light transmission by converting light that enters the liquid crystal cell of multi-domain VA mode into circularly polarized light by a λ/4 retardation film, the contrast is, we found, drastically lowered when a retardation layer that acts as a negative C plate is placed between the liquid crystal cell of multi-domain VA mode and the λ/4 retardation film in order to eliminate the above-described viewing angle dependency problem.

In connection with the above-described background art, on the other hand, the method in which a λ/2 retardation film and a λ/4 retardation film are bonded to each other at a predetermined angle, as described, for example, in Patent Document 6 listed below, has been known as a method for eliminating wavelength dispersion on a λ/4 retardation film. With respect to patterning of a retardation layer, there has been known such a method that a non-patterned λ/4 retardation layer is laminated to a patterned λ/2 retardation layer in order to obtain three-dimensional images, as described in Patent Document 7 as listed below, for example.

In addition, we already filed a patent application relating to a filter substrate that comprises: a retardation layer (containing a nematic liquid crystal as a main component) having the function of converting linearly polarized incident light into circularly polarized light, composed of a λ/2 retardation layer and a λ/4 retardation layer; and a cholesteric liquid crystalline filter having the function of selectively reflecting the light circularly polarized by the retardation layer (see Patent Document 8 listed below). We also already filed a patent application relating to a retardation laminate that comprises a patterned layer of a liquid crystalline material capable of forming a nematic layer (see Patent Document 9 listed below).

LIST OF DOCUMENTS

Patent Document 1: Japanese Laid-Open Patent Publication No. 67219/1991

Patent Document 2: Japanese Laid-Open Patent Publication No. 322223/1992

Patent Document 3: Japanese Laid-Open Patent Publication No. 312166/1998

Patent Document 4: Japanese Laid-Open Patent Publication No. 258605/1999

Patent Document 5: Japanese Laid-Open Patent Publication No. 40428/2002

Patent Document 6: Japanese Laid-Open Patent Publication No. 68816/1998

Patent Document 7: Japanese Laid-Open Patent Publication No. 227998/1998

Patent Document 8: Japanese Patent Application No. 342698/2001 (see Japanese Laid-Open Patent Publication No. 139941/2003)

Patent Document 9: Japanese Patent Application No. 259150/2002 (see Japanese Laid-Open Patent Publication No. 207641/2003)

Non-Patent Document 1: SID (Society for Information Display) '00, Digest of Tech. Papers, 902 (2000)

SUMMARY OF THE INVENTION

The present invention was accomplished in the light of the aforementioned drawbacks in the related art. An object of the present invention is to provide: a laminated retardation optical element that can effectively compensate for the viewing angle dependency of the optical properties of a liquid crystal cell and never decreases contrast and thus never degrades display performance even when placed between a liquid crystal cell and a λ/4 retardation film; a process of producing such a laminated retardation optical element; and a liquid crystal display comprising the laminated retardation optical element.

Means of fulfilling the objects

The present invention provides, as a first aspect, a laminated retardation optical element comprising: an A plate-type retardation layer that acts as an A plate; and a C plate-type retardation layer that is optically bonded to the surface of the A plate-type retardation layer and acts as a negative C plate, wherein the A plate-type retardation layer comprises a cross-linked nematic liquid crystal, and the C plate-type retardation layer comprises a cross-linked chiral nematic or discotic liquid crystal.

In the first aspect of the present invention, the A plate-type retardation layer is preferably a λ/4 retardation layer having the function of brining, to light that passes through this retardation layer, a phase difference corresponding to a quarter of the wavelength of the light.

Further, in the first aspect of the present invention, it is preferable that the laminated retardation optical element further comprises a λ/2 retardation layer having the function of bringing, to light that passes through this retardation layer, a phase difference corresponding to a half of the wavelength of the light, the λ/2 retardation layer being optically bonded to the surface of the λ/4 retardation layer serving as the A plate-type retardation layer, on the side opposite to the C plate-type retardation layer.

In this case, it is preferable that the λ/2 retardation layer comprises a cross-linked nematic liquid crystal. It is also preferable that the angle between the axis of phase advance of the λ/4 retardation layer serving as the A plate-type retardation layer and that of the λ/2 retardation layer be 60±10 degrees.

Furthermore, in the first aspect of the present invention, it is preferable that the C plate-type retardation layer has a thickness of 5 µm or less.

Furthermore, in the first aspect of the present invention, it is preferable that: the laminated retardation optical element further comprises an additional C plate-type retardation layer that is optically bonded to the surface of the C plate-type retardation layer on the side opposite to the A plate-type retardation layer and acts as a negative C plate; the additional C plate-type retardation layer comprises a cross-linked chiral nematic or discotic liquid crystal; the total thickness of the C plate-type retardation layer and the additional C plate-type retardation layer be 6 µm or more; and the thickness of the C plate-type retardation layer be nearly equal to that of the additional C plate-type retardation layer.

Furthermore, in the first aspect of the present invention, it is preferable that the laminated retardation optical element further comprises a polarization layer having the function of controlling the state of polarization of light that passes through the λ/4 retardation layer serving as the A plate-type retardation layer.

In this case, it is preferable that the angle between the axis of phase advance of the λ/4 retardation layer serving as the A plate-type retardation layer and the axis of transmission of the polarization layer be 45±2 degrees (preferably 45 degrees).

Furthermore, in the first aspect of the present invention, it is preferable that the laminated retardation optical element further comprises a polarization layer having the function of controlling the state of polarization of light that passes through the λ/2 retardation layer.

In this case, it is preferable that the angle between the axis of phase advance of the λ/2 retardation layer and the axis of transmission of the polarization layer be 15±5 degrees (preferably 15±2 degrees).

Furthermore, in the first aspect of the present invention, it is preferable that the difference between the mean refractive indices of the retardation layers bonded adjacently to each other be 0.05 or less. It is herein preferable that the nematic liquid crystalline components contained in the retardation layers bonded adjacently to each other be substantially the same.

Furthermore, in the first aspect of the present invention, it is preferable that the A plate-type retardation layer be subjected to patterning to make it into a predetermined pattern. It is also preferable that the C plate-type retardation layer be subjected to patterning to make it into a predetermined pattern.

The present invention provides, as a second aspect of the present invention, a laminated retardation optical element comprising an A plate-type retardation layer that acts as an A plate; and a C plate-type retardation layer that is optically bonded to the surface of the A plate-type retardation layer and acts as a positive C plate, wherein the A plate-type retardation layer comprises a horizontally-aligned, cross-linked nematic liquid crystal, and the C plate-type retardation layer comprises a vertically-aligned, cross-linked nematic liquid crystal.

In the second aspect of the present invention, it is preferable that the C plate-type retardation layer has a thickness of 5 µm or less.

Further, in the second aspect of the present invention, it is preferable that: the laminated retardation optical element further comprises an additional C plate-type retardation layer that is optically bonded to the surface of the C plate-type retardation layer on the side opposite to the A plate-type retardation layer and acts as a positive C plate; the additional C plate-type retardation layer comprises a cross-linked nematic liquid crystal; the total thickness of the C plate-type retardation layer and the additional C plate-type retardation layer be 6 µm or more; and the thickness of the C plate-type retardation layer be nearly equal to that of the additional C plate-type retardation layer.

Furthermore, in the second aspect of the present invention, it is preferable that the laminated retardation optical element further comprises a polarization layer having the function of controlling the state of polarization of light that passes through the A plate-type retardation layer.

Furthermore, in the second aspect of the present invention, it is preferable that the difference between the mean refractive indices of the retardation layers bonded adjacently to each other be 0.05 or less. It is herein preferable that the nematic liquid crystalline components contained in the retardation layers bonded adjacently to each other be substantially the same.

Furthermore, in the second aspect of the present invention, it is preferable that the A plate-type retardation layer be subjected to patterning to make it into a predetermined pattern. It is also preferable that the C plate-type retardation layer be subjected to patterning to make it into a predetermined pattern.

The present invention provides, as a third aspect of the present invention, a process of producing a laminated retardation optical element, comprising the steps of: forming an A plate-type retardation layer that is in the form of a film and acts as an A plate by applying a nematic liquid crystal to an alignment layer and cross-linking the applied liquid crystal; and forming a C plate-type retardation layer that is in the form of a film and acts as a negative C plate by applying a chiral nematic or discotic liquid crystal to the formed A plate-type retardation layer and cross-linking the applied liquid crystal.

In the third aspect of the present invention, the A plate-type retardation layer is preferably a λ/4 retardation layers having the function of bringing, to light that passes through this retardation layer, a phase difference corresponding to a quarter of the wavelength of the light.

Further, in the third aspect of the present invention, it is preferable that: the process further comprises the step of forming a λ/2 retardation layer in the form of a film, having the function of bringing, to light that passes through this retardation layer, a phase difference corresponding to a half of the wavelength of the light, by applying a nematic liquid crystal to the alignment layer and cross-linking the applied liquid crystal; and, in the step of forming the A plate-type retardation layer, the A plate-type retardation layer be formed by applying the nematic liquid crystal not to the alignment layer but to the λ/2 retardation layer and cross-linking the applied liquid crystal.

Furthermore, in the third aspect of the present invention, it is preferable that the process further comprises the step of forming an additional C plate-type retardation layer that is in the form of a film and acts as a negative C plate by applying a chiral nematic or discotic liquid crystal to the formed C plate-type retardation layer and cross-linking the applied liquid crystal.

Furthermore, in the third aspect of the present invention, it is preferable that, in the step of forming the C plate-type retardation layer on the A plate-type retardation layer, the alignment regulation power of the surface of the A type-plate retardation layer be used to align the C plate-type retardation layer. In this case, the alignment regulation power may be imparted to the surface of the A plate-type retardation layer by subjecting this surface to rubbing treatment. The process may further comprise the step of forming an additional alignment layer on the surface of the A plate-type retardation layer, and, in the step of forming the C plate-type retardation layer, the alignment regulation power of the surface of this additional alignment layer may be used to align the C plate-type retardation layer. The azimuth of the alignment regulation power of the surface of the additional alignment layer may be produced by means of rubbing treatment to which the additional alignment layer is subjected or of optical alignment of the additional alignment layer.

In the third aspect of the present invention, it is preferable that, in the step of forming the A plate-type retardation layer on the λ/2 retardation layer, the alignment regulation power of the surface of the λ/2 retardation layer be used to align the A plate-type retardation layer. In this case, the alignment regulation power may be imparted to the surface of the λ/2 retardation layer by subjecting this surface to rubbing treatment. Further, the process may further comprise the step of forming an additional alignment layer on the surface of the λ/2 retardation layer, and, in the step of forming the A plate-type retardation layer, the alignment regulation power of the surface of this additional alignment layer may be used to align the A plate-type retardation layer. The azimuth of the alignment regulation power of the surface of the additional alignment layer may be produced by means of rubbing treatment to which the additional alignment layer is subjected or of optical alignment of the additional alignment layer.

The present invention provides, as a fourth aspect of the present invention, a process of producing a laminated retardation optical element, comprising the steps of: forming a C plate-type retardation layer that is in the form of a film, and acts as a negative C plate by applying a chiral nematic or discotic liquid crystal to an alignment layer and cross-linking the applied liquid crystal; and forming an A plate-type retardation layer that is in the form of a film and acts as an A plate by applying a, nematic liquid crystal to the formed C plate-type retardation layer and cross-linking the applied liquid crystal.

In the fourth aspect of the present invention, the A plate-type retardation layer is preferably a λ/4 retardation layer in the form of a film, having the function of bringing, to light that passes through this retardation layer, a phase difference corresponding to a quarter of the wavelength of the light.

The present invention provides, as a fifth aspect of the present invention, a liquid crystal display comprising: a liquid crystal cell of VA mode; a pair of polarizers between which the liquid crystal cell is sandwiched; and a laminated retardation optical element (comprising a λ/4 retardation layer and a C plate-type retardation layer) according to the above-described first aspect, placed between the liquid crystal cell and at least one of the polarizers, wherein the laminated retardation optical element is arranged so that the C plate-type retardation layer is situated on the side close to the liquid crystal cell.

In the fifth aspect of the present invention, it is preferable that the liquid crystal display further comprises an additional λ/4 retardation layer having the function of bringing, to light that passes through this retardation layer, a phase difference corresponding to a quarter of the wavelength of the light, placed on the liquid crystal cell on the side opposite to the laminated retardation optical element.

In the fifth aspect of the present invention, the liquid crystal display further comprises an additional polarization layer having the function of controlling the state of polarization of light that passes through the additional λ/4 retardation layer, placed on the additional λ/4 retardation layer on the side opposite to the liquid crystal cell.

In this case, it is preferable that the angle between the axis of phase advance of the additional λ/4 retardation layer and the axis of transmission of the additional polarization layer be 45±2 degrees (preferably 45 degrees).

Further, in the fifth aspect of the present invention, it is preferable that the angle between the axis of phase advance of the additional λ/4 retardation layer and that of the λ/4 retardation layer contained in the laminated retardation optical element be substantially equal to 90 degrees.

In the fifth aspect of the present invention, it is preferable that liquid crystalline molecules sealed in the liquid crystal cell be inclined in two or more different directions when an electric field is applied.

The present invention provides, as a sixth aspect of the present invention, a liquid crystal display comprising: a liquid crystal cell of VA mode; a pair of polarizers between which the liquid crystal cell is sandwiched; and a laminated retardation optical element (comprising a λ/2 retardation layer, a λ/4 retardation layer and a C plate-type retardation layer) according to the above-described first aspect, placed between the liquid crystal cell and at least one of the polarizers, wherein the laminated retardation optical element is arranged so that the C plate-type retardation layer is situated on the side close to the liquid crystal cell.

In the sixth aspect of the present invention, it is preferable that the liquid crystal display further comprises: an additional λ/4 retardation layer having the function of bringing, to light that passes through this retardation layer, a phase difference corresponding to a quarter of the wavelength of the light, placed on the liquid crystal cell on the side opposite to the laminated retardation optical element; and an additional λ/2 retardation layer having the function of bringing, to light that passes through this retardation layer, a phase difference corresponding to a half of the wavelength of the light, placed on the additional λ/4 retardation layer on the side opposite to the liquid crystal cell.

In this case, it is preferable that the angle between the axis of phase advance of the additional λ/4 retardation layer and that of the additional λ/2 retardation layer be 60±10 degrees.

Further, in the sixth aspect of the present invention, it is preferable that the liquid crystal display further comprises an additional polarization layer having the function of controlling the state of polarization of light that passes through the additional λ/2 retardation layer, placed on the additional λ/2 retardation layer on the side opposite to the liquid crystal cell.

In this case, it is preferable that the angle between the axis of phase advance of the additional λ/2 retardation layer and the axis of transmission of the additional polarization layer be 15±5 degrees (preferably 15±2 degrees).

Furthermore, in the sixth aspect of the present invention, it is preferable that the angle between the axis of phase advance of the additional λ/2 retardation layer and that of the λ/2 retardation layer contained in the laminated retardation optical element be substantially equal to 90 degrees.

In the sixth aspect of the present invention, it is preferable that liquid crystalline molecules sealed in the liquid crystal cell be inclined in two or more different directions when an electric field is applied.

Effects of the invention

According to the first aspect of the present invention, an A plate-type retardation layer that acts as an A plate (preferably a λ/4 retardation layer), and a C plate-type retardation layer that acts as a negative C plate, are optically bonded to each other; moreover, the A plate-type retardation layer and the C plate-type retardation layer comprise a cross-linked nematic liquid crystal and a cross-linked chiral nematic or discotic liquid crystal, respectively. Thus, after light linearly polarized by a polarizer has been once converted into circularly polarized light or the like by the A plate-type retardation layer, the phase difference brought by a liquid crystal cell of VA mode can be cancelled by the C plate-type retardation layer. For this reason, even if the liquid crystal cell of VA mode in a liquid crystal display, in which the laminated retardation optical element is incorporated, is that of multi-domain VA mode, the laminated retardation optical element can effectively compensate for viewing angle dependency. Moreover, according to the first aspect of the present invention, since the A plate-type retardation layer and the C plate-type retardation layer are optically bonded to each other and, at the same time, are made from cross-linked liquid crystals, the laminated retardation optical element, a laminate of the two retardation layers, can be made thin. In addition, even when the laminated retardation optical element is incorporated in a liquid crystal display, lowering of contrast that is caused by interfacial reflection that occurs in the laminated retardation optical element can be effectively prevented.

In the first aspect of the present invention, if a λ/2 retardation layer having the function of bringing, to light that passes through this retardation layer, a phase difference corresponding to a half of the wavelength of the light is optically bonded to the surface of the λ/4 retardation layer serving as the A plate-type retardation layer, on the side opposite to the C plate-type retardation layer, compensation for wavelength dispersion on the λ/4 retardation layer is effectively provided by the λ/2 retardation layer. A λ/4 retardation layer that covers a wide wave range can thus be obtained as a whole.

In this case, if the λ/2 retardation layer comprises a cross-linked nematic liquid crystal, lowering of contrast can be prevented more effectively.

Further, if the angle between the axis of phase advance of the λ/4 retardation layer serving as the A plate-type retardation layer and that of the λ/2 retardation layer is made 60±10 degrees, compensation for wavelength dispersion on the λ/4 retardation layer can be provided with certainty.

Furthermore, in the first aspect of the present invention, if the thickness of the C plate-type retardation layer is made 5 µm or less, liquid crystalline molecules in the C plate-type retardation layer can be well aligned even when only one surface of a liquid crystal layer that is made into the C plate-type retardation layer is aligned by the alignment regulation power of the surface of the A plate-type retardation layer (preferably a λ/4 retardation layer) or by that of the surface of the alignment layer formed on the A plate-type retardation layer.

Furthermore, in the first aspect of the present invention, if an additional C plate-type retardation layer that acts as a negative C plate is optically bonded to the surface of the C plate-type retardation layer on the side opposite to the A plate-type retardation layer (preferably a λ/4 retardation layer), and if this additional C plate-type retardation layer is made from a cross-linked chiral nematic or discotic liquid crystal, and if the total thickness of the C plate-type retardation layer and the additional C plate-type retardation layer is made 6 µm or more, and if the thickness of the C plate-type retardation layer is made nearly equal to that of the additional C plate-type retardation layer, the laminated retardation optical element can effectively cope even with the case where the retardation that is brought by a liquid crystal cell of VA mode and requires compensation by the C plate-type retardation layer acting as a negative C plate is great.

Furthermore, in the first aspect of the present invention, if a polarization layer having the function of controlling the state of polarization of light that passes through the λ/4 retardation layer serving as the A plate-type retardation layer is provided, it becomes possible to convert, for example, linearly polarized light to circularly polarized light, or circularly polarized light to linearly polarized light. The desired property of polarizing light can thus be imparted to the laminated retardation optical element.

Furthermore, in the first aspect of the present invention, if a polarization layer having the function of controlling the state of polarization of light that passes through the λ/2 retardation layer used along with the λ/4 retardation layer serving as the A plate-type retardation layer is provided, it becomes possible to convert, for example, linearly polarized light to circularly polarized light, or circularly polarized light to linearly polarized light. It is therefore possible to obtain, from the λ/4 retardation layer and the λ/2 retardation layer, a λ/4 retardation layer that covers a wide wave range, and, at the same time, to impart the desired property of polarizing light to the laminated retardation optical element.

Furthermore, in the first aspect of the present invention, if the difference between the mean refractive indices of the retardation layers bonded adjacently to each other is made 0.05 or less, it becomes possible to prevent occurrence of interfacial reflection in the laminated retardation optical element, and thus to more effectively prevent lowering of contrast.

In this case, if the nematic liquid crystalline components contained in the retardation layers bonded adjacently to each other are made substantially the same, the above-described effects can be obtained more surely.

Furthermore, in the first aspect of the present invention, if the A plate-type retardation layer (preferably a λ/4 retardation layer) (or a λ/2 retardation layer) is subjected to patterning and made into a predetermined pattern, circularly polarized light that enters a liquid crystal cell which is driven by the application of an electric field, in a liquid crystal display in which the laminated retardation optical element is incorporated, can be made into at least two types of light, for example, right-handed circularly polarized light and left-handed circularly polarized light. Therefore, by so patterning the A type-plate retardation layer, it becomes possible to produce even a so-called three-dimensional display. In addition, if the C plate-type retardation layer (or the additional C plate-type retardation layer) is subjected to patterning and made into a predetermined pattern equal to the pattern of the A plate-type retardation layer (preferably a λ/4 retardation layer) (or a λ/2 retardation layer) or the like, it becomes possible to create at least two retardation areas that are different in viewing angle dependency, and thus to provide a laminated retardation optical element suitable for the intended use.

According to the second aspect of the present invention, the C plate-type retardation layer that acts as a positive C plate is optically bonded to the surface of the A plate-type retardation layer that acts as a (positive) A plate; moreover, the A plate-type retardation layer and the C plate-type retardation layer are made from a horizontally-aligned, cross-linked nematic liquid crystal, and a vertically-aligned, cross-linked nematic liquid crystal, respectively. Thus, when the laminated retardation optical element is incorporated in a liquid crystal display, the C plate-type and A plate-type retardation layers can compensate for the phase difference of light that has slantingly entered from the direction deviating from the normal to the polarizers arranged in the cross nicol disposition. For this reason, in a liquid crystal display in which such a laminated retardation optical element is incorporated, no light leaks slantingly from the polarizers, and the liquid crystal display can thus have improved viewing angle characteristic. Further, according to the second aspect of the present invention, since the C plate-type retardation layer and the A plate-type retardation layer are optically bonded to each other, and, at the same time, are made from cross-linked liquid crystals, the laminated retardation optical element, a laminate of the two retardation layers, can be made thin. In addition, even when the laminated retardation optical element is incorporated in a liquid crystal display, lowering of contrast that is caused by interfacial reflection that occurs in the laminated retardation optical element can be effectively prevented.

In the second aspect of the present invention, if the thickness of the C plate-type retardation layer is made 5 μm or less, liquid crystalline molecules in the C plate-type retardation layer can be well aligned even when only one surface of a liquid crystal layer that is made into the C plate-type retardation layer is aligned by the alignment regulation power of the surface of the A plate-type retardation layer or by that of the surface of the alignment layer formed on the A plate-type retardation layer.

Further, in the second aspect of the present invention, if an additional C plate-type retardation layer that acts as a positive C plate is optically bonded to the surface of the C plate-type retardation layer on the side opposite to the A plate-type retardation layer, and if this additional C plate-type retardation layer is made from a cross-linked nematic liquid crystal, and if the total thickness of the C plate-type retardation layer and the additional C plate-type retardation layer is made 6 μm or more, and if the thickness of the C plate-type retardation layer is made nearly equal to that of the additional C plate-type retardation layer, the laminated retardation optical element can effectively cope even with the case where the phase shift that requires compensation by the C plate-type retardation layer acting as a positive C plate is in a large amount.

Furthermore, in the second aspect of the present invention, if a polarization layer having the function of controlling the state of polarization of light that passes through the A plate-type retardation layer is provided, the desired property of polarizing light can be imparted to the laminated retardation optical element.

Furthermore, in the second aspect of the present invention, if the difference between the mean refractive indices of the retardation layers bonded adjacently to each other is made 0.05, or less, it becomes possible to prevent occurrence of interfacial reflection in the laminated retardation optical element and thus to more effectively prevent lowering of contrast.

In this case, if the nematic liquid crystalline components contained in the retardation layers bonded adjacently to each other are made substantially the same, the above-described effects can be obtained more surely.

Furthermore, in the second aspect of the present invention, if the A plate-type retardation layer is subjected to patterning and made into a predetermined pattern, circularly polarized light that enters a liquid crystal cell which is driven by the application of an electric field, in a liquid crystal display in which the laminated retardation optical element is incorporated, can be made into at least two different types of light, for example, right-handed circularly polarized light and left-handed circularly polarized light. Therefore, by so patterning the A type-plate retardation layer, it becomes possible to produce even a so-called three-dimensional display. In addition, if the C plate-type retardation layer (or the additional C plate-type retardation layer) is subjected to patterning and made into a predetermined pattern equal to the pattern of the A plate-type retardation layer or the like, it becomes possible to create at least two retardation areas that are different in viewing angle dependency, and thus to provide a laminated retardation optical element suitable for the intended use.

According to the third aspect of the present invention, an A plate-type retardation layer (preferably a λ/4 retardation layer) that is in the form of a film and acts as an A plate is formed by applying a nematic liquid crystal to an alignment layer and cross-linking the applied liquid crystal; then, a C plate-type retardation layer that is in the form of a film and acts as a negative C plate is formed by applying a chiral nematic or discotic liquid crystal to the formed A plate-type retardation layer and cross-linking the applied liquid crystal. Therefore, a laminated retardation optical element comprising the A plate-type retardation layer (preferably a λ/4 retardation layer) and the C plate-type retardation layer, having the function of effectively compensating for the viewing angle dependency of the optical properties of a liquid crystal cell, being in the form of a thin film, capable of preventing lowering of contrast that is caused by interfacial reflection, can be obtained at high productivity.

In the third aspect of the present invention, the process may further comprise the step of forming a λ/2 retardation layer in the form of a film, having the function of bringing, to light that passes through this retardation layer, a phase difference corresponding to a half of the wavelength of the light, by applying a nematic liquid crystal to the alignment layer and cross-linking the applied liquid crystal; in addition, in the step of forming the A plate-type retardation layer (preferably a λ/4 retardation layer), the A plate-type retardation layer may be formed by applying the nematic liquid crystal not to the alignment layer but to the λ/2 retardation layer and cross-linking the applied liquid crystal. In this case, there can be obtained a laminated retardation optical element comprising the λ/2 retardation layer, the A plate-type retardation layer and the C plate-type retardation layer, capable of effectively compensating for wavelength dispersion on the A plate-type retardation layer (preferably a λ/4 retardation layer).

Further, in the third aspect of the present invention, if an additional C plate-type retardation layer that is in the form of a film and acts as a negative C plate is formed by applying a chiral nematic or discotic liquid crystal to the formed C plate-type retardation layer and cross-linking the applied liquid crystal, there can be obtained a laminated retardation optical element comprising the C plate-type retardation layer that is relatively thick and acts as a negative C plate.

In the third aspect of the present invention, if, in the step of forming the C plate-type retardation layer on the A plate-type retardation layer (preferably a λ/4 retardation layer), the alignment regulation power of the surface of the A type-plate retardation layer is used to align the C plate-type retardation layer, it is possible to obtain a laminated retardation optical element without forming an alignment layer on the A plate-type retardation layer.

In the third aspect of the present invention, if, in the step of forming, the A plate-type retardation layer (preferably a λ/4 retardation layer) on the λ/2 retardation layer, the alignment regulation power of the surface of the λ/2 retardation layer is used to align the A plate-type retardation layer, it is possible to obtain a laminated retardation optical element without forming an alignment layer on the λ/2 retardation layer.

According to the fourth aspect of the present invention, a C plate-type retardation layer that is in the form of a film and acts as a negative C plate is formed by applying a chiral nematic or discotic liquid crystal to an alignment layer and cross-linking the applied liquid crystal; then, an A plate-type retardation layer (preferably a λ/4 retardation layer) that is in the form of a film and acts as an A plate is formed by applying a nematic liquid crystal to the formed C plate-type retardation layer and cross-linking the applied liquid crystal. Therefore, a laminated retardation optical element comprising the A plate-type retardation layer (preferably a λ/4 retardation layer) and the C plate-type retardation layer, having the function of effectively compensating for the viewing angle dependency of the optical properties of a liquid crystal cell, being in the form of a thin film, capable of preventing lowering of contrast that is caused by interfacial reflection, can be obtained at high productivity.

According to the fifth aspect of the present invention, the laminated retardation optical element comprising the λ/4 retardation layer (the layer having the function of bringing, to light that passes through this retardation layer, a phase difference corresponding to a quarter of the wavelength of the light) and the C plate-type retardation layer (the layer acting as a negative C plate) is placed between a liquid crystal cell of VA mode and a polarizer in a liquid crystal display so that the C plate-type retardation layer is situated on the side close to the liquid crystal cell, whereby, of the light in the predetermined state of polarization that has entered and/or emerged from the liquid crystal cell, the light that has emerged in the direction deviating from the normal to the liquid crystal cell is compensated for the state of polarization. Therefore, the C plate-type retardation layer can cancel the phase difference brought by the liquid crystal cell of VA mode. For this reason, even if the liquid crystal cell of VA mode is a so-called liquid crystal cell of multi-domain VA mode, the laminated retardation optical element can effectively compensate for viewing angle dependency. Further, according to the fifth aspect of the present invention, since the λ/4 retardation layer and the C plate-type retardation layer contained in the laminated retardation optical element are optically bonded, and, at the same time, are made from cross-linked liquid crystals, the laminated retardation optical element, a laminate of the two retardation layers, can be made thin, and lowering of contrast that is caused by interfacial reflection that occurs in the laminated retardation optical element can be effectively prevented.

In the fifth aspect of the present invention, if an additional λ/4 retardation layer having the function of bringing, to light that passes through this retardation layer, a phase difference: corresponding to a quarter of the wavelength of the light is placed on the liquid crystal cell on the side opposite to the laminated retardation optical element, the liquid crystal cell of VA mode and the C plate-type retardation layer can be sandwiched between a pair of the λ/4 retardation layers. Therefore, it becomes possible to convert, by one of the λ/4 retardation layers, linearly polarized light into circularly polarized light, and, by the other λ/4 retardation layer, circularly polarized light into linearly polarized light; there can thus be obtained a liquid crystal display of circularly polarized light VA mode.

In the fifth aspect of the present invention, if an additional polarization layer having the function of controlling the state of polarization of light that passes through the additional λ/4 retardation layer is formed on the additional λ/4 retardation layer on the side opposite to the liquid crystal cell, it becomes possible to convert, for example, linearly polarized light to circularly polarized light, or circularly polarized light to linearly polarized light. Therefore, the desired property of polarizing light can be imparted to the laminated retardation optical element, and the liquid crystal cell of VA mode can thus be effectively used as an optical shutter.

In the fifth aspect of the present invention, if the angle between the axis of phase advance of the additional λ/4 retardation layer and that of the λ/4 retardation layer contained in the laminated retardation optical element is made substantially equal to 90 degrees, there can be obtained a liquid crystal display with high contrast.

In the fifth aspect of the present invention, in the case that the liquid crystal cell of VA mode is such that liquid crystalline molecules sealed in the liquid crystal cell are inclined in two or more different directions when an electric field is applied, it is possible to use circularly polarized light as light that passes through the liquid crystal cell, so that the above-described effects can be obtained more remarkably.

According to the sixth aspect of the present invention, the laminated retardation optical element comprising the λ/2 retardation layer (the layer having the function of bringing, to light that passes through this retardation layer, a phase difference corresponding to a half of the wavelength of the light), the λ/4 retardation layer (the layer having the function of bringing, to light that passes through this retardation layer, a phase difference corresponding to a quarter of the wavelength of the light), and the C plate-type retardation layer (the layer acting as a negative C plate) is placed between a liquid crystal cell of VA mode and a polarizer in a liquid crystal display so that the C plate-type retardation layer is situated on the side close to the liquid crystal cell, whereby, of the light in the predetermined state of polarization that has entered and/or emerged from the liquid crystal cell, the light that has emerged in the direction deviating from the normal to the liquid crystal cell is compensated for the state of polarization of light. Therefore, the C plate-type retardation layer can cancel the phase difference brought by the liquid crystal cell of VA mode. For this reason, the laminated retardation optical element can effectively compensate for viewing angle dependency even when the liquid crystal cell of VA mode is a so-called liquid crystal cell of multi-domain VA mode. Further, according to the fifth aspect of the present invention, since the λ/2 retardation layer, the λ/4 retardation layer and the C plate-type retardation layer contained in the laminated retardation optical element are optically bonded, and, at the same time, are made from cross-linked liquid crystals, the laminated retardation optical element, a laminate of these retardation layers, can be made thin, and lowering of contrast that is caused by interfacial reflection that occurs in the laminated retardation optical element can be effectively prevented.

In the sixth aspect of the present invention, if an additional λ/4 retardation layer having the function of bringing, to light that passes through this retardation layer, a phase difference corresponding to a quarter of the wavelength of the light is placed on the liquid crystal cell on the side opposite to the laminated retardation optical element, and an additional λ/2 retardation layer having the function of bringing, to light that passes through this retardation layer, a phase difference corresponding to a half of the wavelength of the light is placed on the additional λ/4 retardation layer on the side opposite to the liquid crystal cell, the liquid crystal cell of VA mode and the C plate-type retardation layer are sandwiched between a pair of the λ/4 retardation layers, whereby a liquid crystal display of circularly polarized light VA mode can be obtained. In addition, since the λ/2 retardation layer effectively compensates for wavelength dispersion on the λ/4 retardation layer, there can be obtained, as a whole, a λ/4 retardation layer that covers a wide wave range.

In this case, if the angle between the axis of phase advance of the additional λ/4 retardation layer and that of the additional λ/2 retardation layer is made 60±10 degrees, compensation for wavelength dispersion on the λ/4 retardation layer can be provided with certainty.

Further, in the sixth aspect of the present invention, if an additional polarization layer having the function of controlling the state of polarization of light that passes through the λ/2 retardation layer used together with the additional λ/4 retardation layer is placed on the additional λ/2 retardation layer on the side opposite to the liquid crystal cell, it becomes possible to convert, for example, linearly polarized light to circularly polarized light, or circularly polarized light to linearly polarized light. Therefore, the λ/4 retardation layer and the λ/2 retardation layer can constitute a λ/4 retardation layer that covers a wide wave range, and, at the same time, the desired property of polarizing light can be imparted to the laminated retardation optical element. The liquid crystal cell of VA mode can thus be effectively used as an optical shutter.

Furthermore, in the sixth aspect of the present invention, if the angle between the axis of phase advance of the additional λ/2 retardation layer and that of the λ/2 retardation layer contained in the laminated retardation optical element is made substantially equal to 90 degrees, there can be obtained a liquid crystal display with high contrast.

In the sixth aspect of the present invention, in the case that the liquid crystal cell of VA mode is such that liquid crystalline molecules sealed in the liquid crystal cell are inclined in two or more different directions when an electric field is applied, it is possible to use circularly polarized light as light that passes through the liquid crystal cell. The above-described effects can thus be obtained more remarkably.

DETAILED DESCRIPTION OF PREFERRED EMBODIMENTS

By referring to the accompanying drawings, embodiments of the present invention will be described hereinafter.

A liquid crystal display, in which a laminated retardation optical element according to an embodiment of the present invention is incorporated, is firstly described with reference to FIG. 1.

Figure 1:
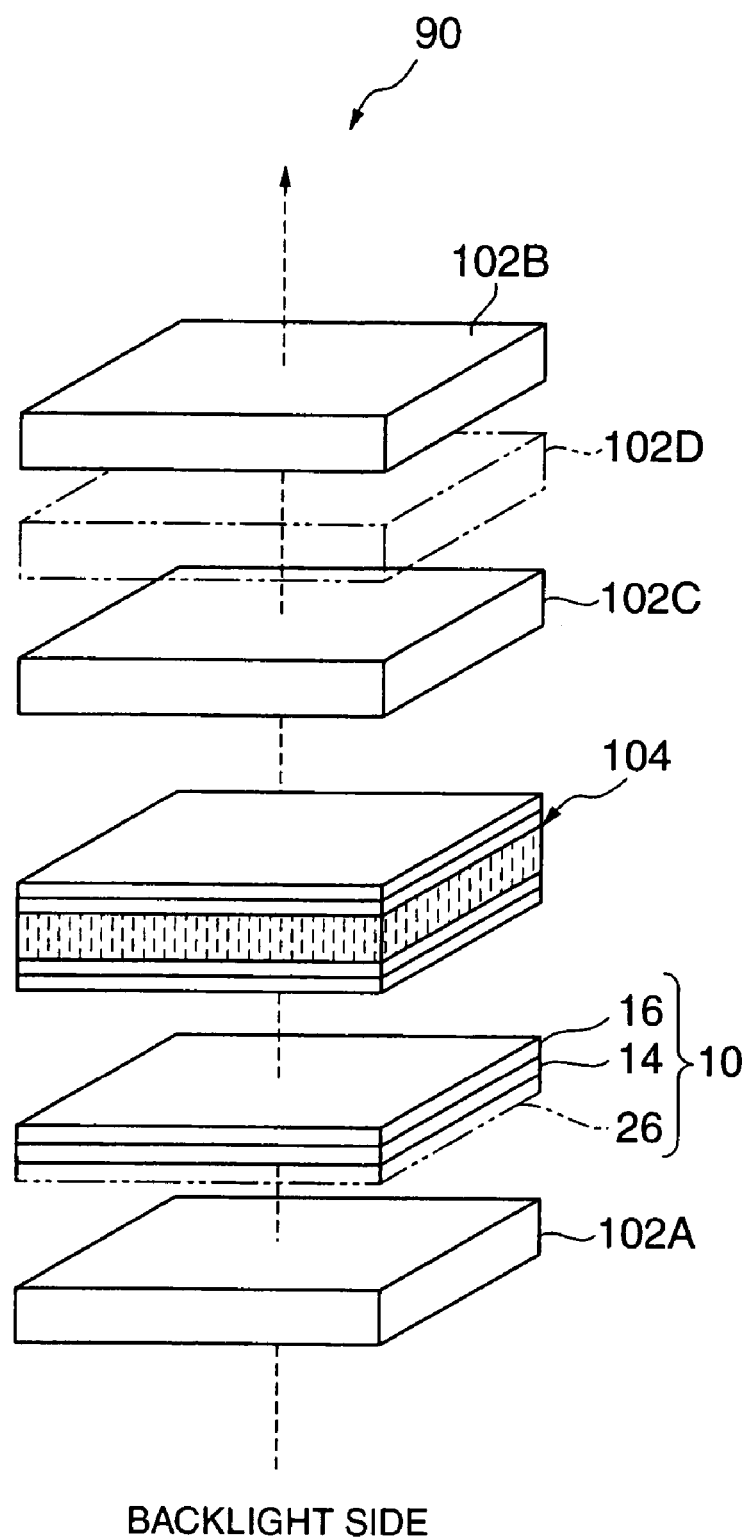
FIG. 1 is an exploded, diagrammatic perspective view showing a liquid crystal display comprising a laminated retardation optical element according to an embodiment of the present invention.

As shown in FIG. 1, a liquid crystal display 90 contains a polarizer 102A on the incident side, a polarizer 102B on the emergent side, and a liquid crystal cell 104.

Of these component parts, the polarizers 102A and 102B are so constructed that they selectively transmit only linearly polarized light having a plane of vibration in a predetermined direction, and are arranged in the cross nicol disposition so that the direction of vibration of linearly polarized light which the polarizer 102A transmits is perpendicular to that of vibration of linearly polarized light which the polarizer 102B transmits. The liquid crystal cell 104 comprises a large number of cells corresponding to pixels, and is placed between the polarizers 102A and 102B.

In the liquid crystal display 90, the liquid crystal cell 104 is of VA mode, which a nematic liquid crystal having negative dielectric anisotropy is sealed. Linearly polarized light that has passed through the polarizer 102A on the incident side passes, without undergoing phase shift, through those cells in the liquid crystal cell 104 that are in the non-driven state, and is blocked by the polarizer 102B on the emergent side. On the contrary, the linearly polarized light undergoes phase shift when it passes through those cells in the liquid crystal cell 104 that are in the driven state, and the light in an amount corresponding to the amount of this phase shift passes through and emerges from the polarizer 102B on the emergent side. It is therefore possible to display the desired image on the emergent-side polarizer 102B side by properly controlling the driving voltage that is applied to each cell in the liquid crystal cell 104. The liquid crystal cell 104 of VA mode is preferably a liquid crystal cell of so-called multi-domain VA mode in which liquid crystalline molecules are inclined in two or more different directions when an electric field is applied.

In the liquid crystal display 90 of such a construction, a laminated retardation optical element 10 is placed between the polarizer 102A on the incident side and the liquid crystal cell 104, and a λ/4 retardation film 102C, between the polarizer 102B on the emergent side and the liquid crystal cell 104. The laminated retardation optical element 10 comprises: a λ/4 retardation layer (an A plate-type retardation layer that acts as an A plate) 14 having the function of bringing, to light that passes through this retardation layer, a phase difference corresponding to a quarter of the wavelength of the light; and a C plate-type retardation layer 16 that acts as a negative C plate. The phase difference (retardation) to be brought by the λ/4 retardation layer 14 is properly designed according to the wavelength of the objective light. Specifically, for example, it is designed according to a wavelength freely selected from the visible wave range (400 to 800 nm) in consideration of spectral luminous efficacy and so on. Preferably, as shown in FIG. 1, the laminated retardation optical element 10 is placed so that the λ/4 retardation layer 14 faces to the polarizer 102 on the incident side and that the C plate-type retardation layer 16 faces to the liquid crystal cell 104. By so placing the laminated retardation optical element 10, it is possible to effectively obtain the desired performance.

Since the laminated retardation optical element 10 contains the λ/4 retardation layer 14 as mentioned above, the liquid crystal cell 104 of VA mode is driven, with the liquid crystal cell 104 sandwiched between the λ/4 retardation layer 14 contained in the laminated retardation optical element 10 placed on the incident-side polarizer 102A side and the λ/4 retardation film 102C placed on the emergent-side polarizer 102B side. The mode of driving liquid crystal display, in which light that enters the liquid crystal cell 104 of VA mode is circularly polarized light, is called circularly polarized light VA mode.

Further, the laminated retardation optical element 10 comprises, as described above, the C plate-type retardation layer 16 that acts as a negative C plate, so that, of the light that enters the liquid crystal cell 104, the light that enters slantingly from the direction deviating from the normal to the liquid crystal cell 104 can be compensated for the state of polarization of light by the laminated retardation optical element 10.

Next, the principle of optical compensation that is provided in the liquid crystal display shown in FIG. 1 by the laminated retardation optical element 10 will be explained with reference to FIG. 2.

Figure 2:
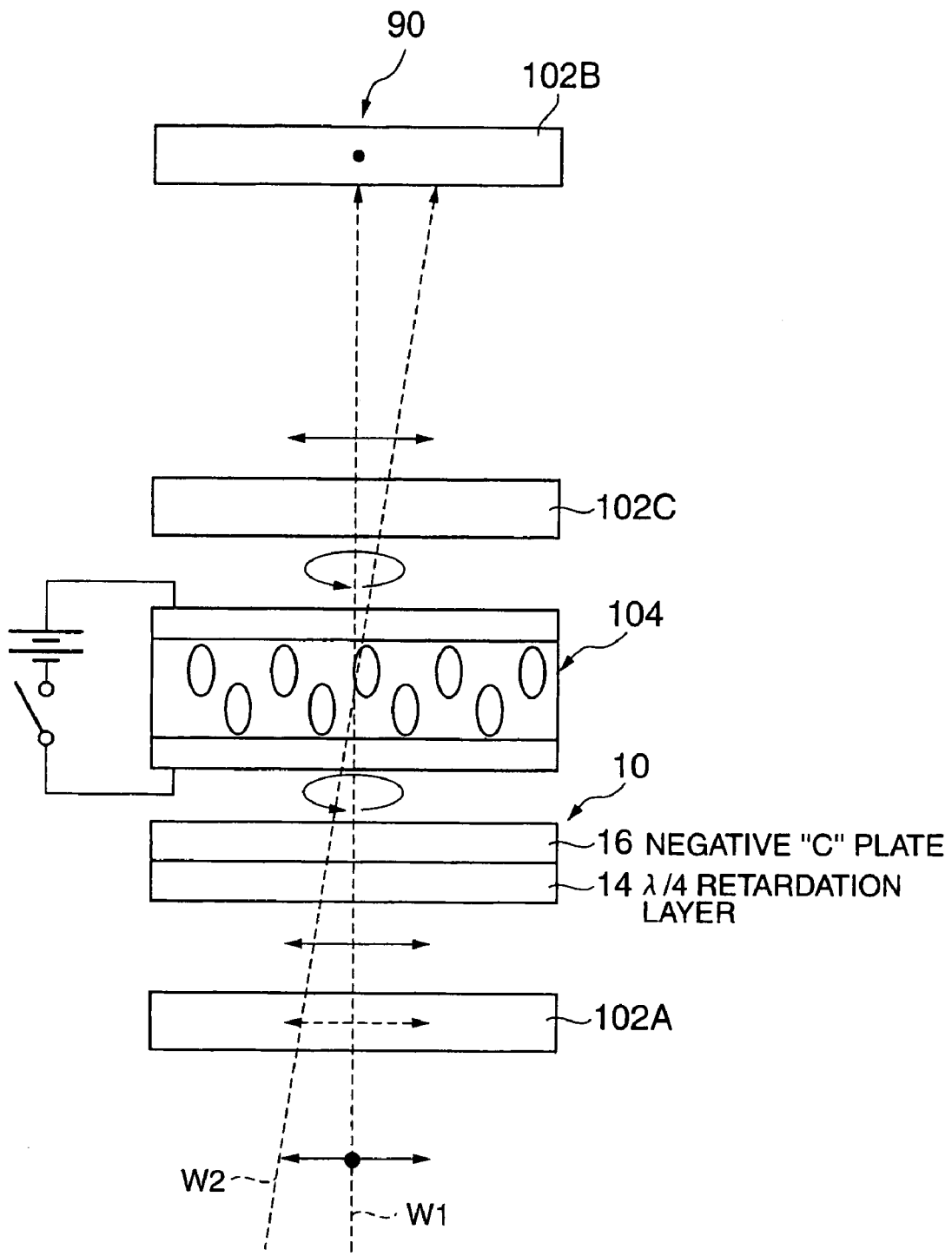
FIG. 2 is a diagrammatic view for explaining the principle of optical compensation that is provided in the liquid crystal display shown in FIG. 1 by the laminated retardation optical element.

FIG. 2 is a diagrammatic view showing the principle of optical compensation that is provided in the case where the liquid crystal cell 104 in the liquid crystal display 90 is in the non-driven state and where non-polarized light rays W1 and W2 emitted from a light source (not shown in the figure) enter the liquid crystal display 90. In this figure, the symbols "←→" and "•" both indicate linearly polarized light, where "←→" indicates linearly polarized light whose field vibration vector points in the direction of paper plane, and "•" indicates linearly polarized light whose field vibration vector points in the direction vertical to the paper plane. The circle with an arrow indicates circularly polarized light.

Referring to FIG. 2, non-polarized light W1 that is emitted from a light source (not shown in the figure) and enters the liquid crystal cell 104 along the normal to it becomes linearly polarized light because the polarizer 102A on the incident side absorbs a linearly polarized component in the direction "•" but transmits the remaining linearly polarized component in the direction "←→".

The above linearly polarized light is converted to circularly polarized light by the λ/4 retardation layer 14 contained in the laminated retardation optical element 10, and passes, with its state of polarization maintained (circularly polarized light), through the C plate-type retardation layer 16 in the laminated retardation optical element 10 and through the liquid crystal cell 104 to which no electric field is applied.

The circularly polarized light that has passed through the liquid crystal cell 104 in this way is converted by the λ/4 retardation film 102C into linearly polarized light in the direction "←→" and is blocked by the emergent-side polarizer 102B that transmits only a linearly polarized component in the direction "•".

On the other hand, non-polarized light W2 that enters the liquid crystal cell 104 slantingly from the direction deviating from the normal to it becomes linearly polarized light because the polarizer 102A on the incident side absorbs a linearly polarized component in the direction "•" but transmits a linearly polarized component in the direction "←→".

The above linearly polarized light is converted to circularly polarized light by the λ/4 retardation layer 14 in the laminated retardation optical element 10. Since the liquid crystal cell 104 of VA mode acts as a positive C plate, light that slantingly enters the liquid crystal cell 104 from the direction deviating from the normal to it undergoes phase shift while passing through the liquid crystal cell 104 to become elliptically polarized light.

However, in the liquid crystal display 90 shown in FIG. 2, the amount of the phase shift, which occurs due to the liquid crystal cell 104 to which no electric field is applied being acting as a positive C plate, has been decreased from the light in advance to produce elliptically polarized light by the C plate-type retardation layer 16 in the laminated retardation optical element 10, so that this light returns to circularly polarized light after passing through the liquid crystal cell 104 to which no electric field is applied.

For this reason, the circularly polarized light that has passed through the liquid crystal cell 104 in this way is converted by the λ/4 retardation film 102C into linearly polarized light in the direction "←→" and is blocked by the emergent-side polarizer 102B that transmits only a linearly polarized component in the direction "•", as in the case where non-polarized light W1 enters the liquid crystal cell 104 along the normal to it.

As described above, according to the liquid crystal display 90 shown in FIGS. 1 and 2, the laminated retardation optical element 10 is placed between the polarizer 102A on the incident side and the liquid crystal cell 104 to optically compensate for the phase shift (retardation) brought by the liquid crystal cell 104, so that it is possible to prevent leakage, from the polarizer 102B on the emergent side, of part of light that has emerged from the liquid crystal cell 104 in the direction deviating from the normal to it and thus to eliminate the viewing angle dependency problem with the liquid crystal display 90 to improve viewing angle characteristic.

The liquid crystal display 90 shown in FIGS. 1 and 2 is of transmission type which light passes from one side to the other in the direction of thickness. The present invention is not limited to this, and the laminated retardation optical element 10 according to the above-described embodiment may also be incorporated in a liquid crystal display of reflection or semi-reflection (reflection/transmission) type.

Further, in the liquid crystal display 90 shown in FIGS. 1 and 2, the laminated retardation optical element 10 according to the above-described embodiment is placed between the liquid crystal cell 104 and the polarizer 102A on the incident side. However, the laminated retardation optical element 10 may be placed between the liquid crystal cell 104 and the polarizer 102B on the emergent side, depending on the state of optical compensation. Furthermore, the laminated retardation optical element 10 may also be placed on both sides of the liquid crystal cell 104 (between the liquid crystal cell 104 and the polarizer 102A on the incident side, and between the liquid crystal cell 104 and the polarizer 102B on the emergent side). The number of the laminated retardation optical element 10 that is placed between the liquid crystal cell 104 and the polarizer 102A on the incident side or between the liquid crystal cell 104 and the polarizer 102B on the emergent side is not limited to one, and a plurality of the laminated retardation optical elements may be placed.

Next, the construction of the laminated retardation optical element 10 that is incorporated in the liquid crystal display 90 shown in FIG. 1 will be explained with reference to FIG. 3A.

Figure 3A:
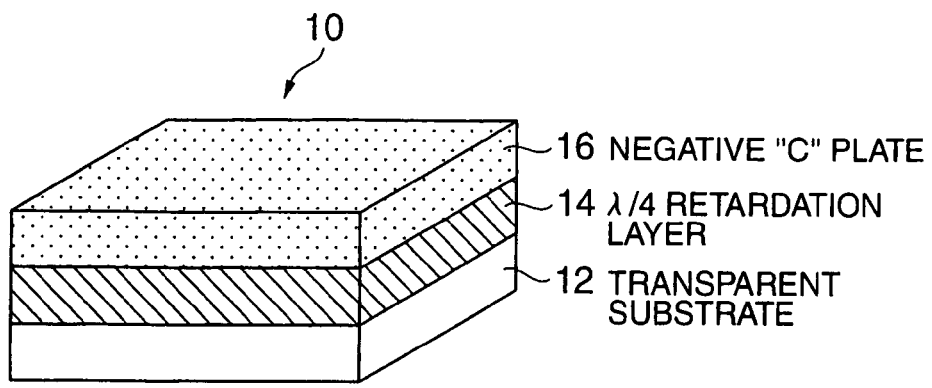
FIGS. 3A and 3B are enlarged, diagrammatic perspective views showing laminated retardation optical elements according to an embodiment of the present invention.

As shown in FIG. 3A, the laminated retardation optical element 10 contains: a λ/4 retardation layer (first retardation layer) 14 having the function of bringing, to light that passes through this retardation layer, a phase difference corresponding to a quarter of the wavelength of the light; and a C plate-type retardation layer (second retardation layer) 16 that acts as a negative C plate. The λ/4 retardation layer 14 and the C plate-type retardation layer 16 are laminated to a transparent substrate 12 in the order mentioned, and these two retardation layers are optically bonded to each other.

In the laminated retardation optical element 10 shown in FIG. 3A, the λ/4 retardation layer 14 and the C plate-type retardation layer 16 are laminated to the transparent substrate 12 in this order. However, it is also possible to laminate the C plate-type retardation layer 16 and the λ/4 retardation layer 14 to the transparent substrate 12 in this order, as in the laminated retardation optical element 10' shown in FIG. 3B.

The λ/4 retardation layer 14 comprises as its main component a horizontally-aligned, cross-linked nematic liquid crystal, and the C plate-type retardation layer 16 comprises as its main component a cross-linked chiral nematic liquid crystal (a cross-linked nematic liquid crystal and a cross-linked chiral agent) or cross-linked discotic liquid crystal.

Three-dimensionally cross-linkable liquid crystalline monomers or oligomers can be used as materials for the nematic liquid crystal. If any chiral agent is added to the nematic liquid crystal in an amount of approximately several to 10%, a chiral nematic liquid crystal (cholesteric liquid crystal) can be obtained. By "three-dimensional cross-linking" is herein meant that liquid crystalline monomer or oligomer molecules are three-dimensionally polymerized to give a network structure. By making the liquid crystalline molecules into such a state, it is possible to optically fix the liquid crystalline molecules with its cholesteric or nematic structure maintained and thus to obtain a film that is easy to handle as an optical film and is stable at normal temperatures.

Mixtures of liquid crystalline monomers and chiral compounds as disclosed, for example, in Japanese Laid-Open Patent Publication No. 258638/1995, Published Japanese Translation No. 508882/1998 of PCT International Publication for Patent Application, and Japanese Laid-Open Patent Publications No. 167126/2003 and No. 185827/2003 can be used as the three-dimensionally cross-linkable monomers. More specifically, it is possible to use liquid crystalline monomers represented by general chemical formulae (1) to (11) and (11-2). In liquid crystalline monomers represented by general chemical formula (11), X is preferably an integer of 2 to 5.

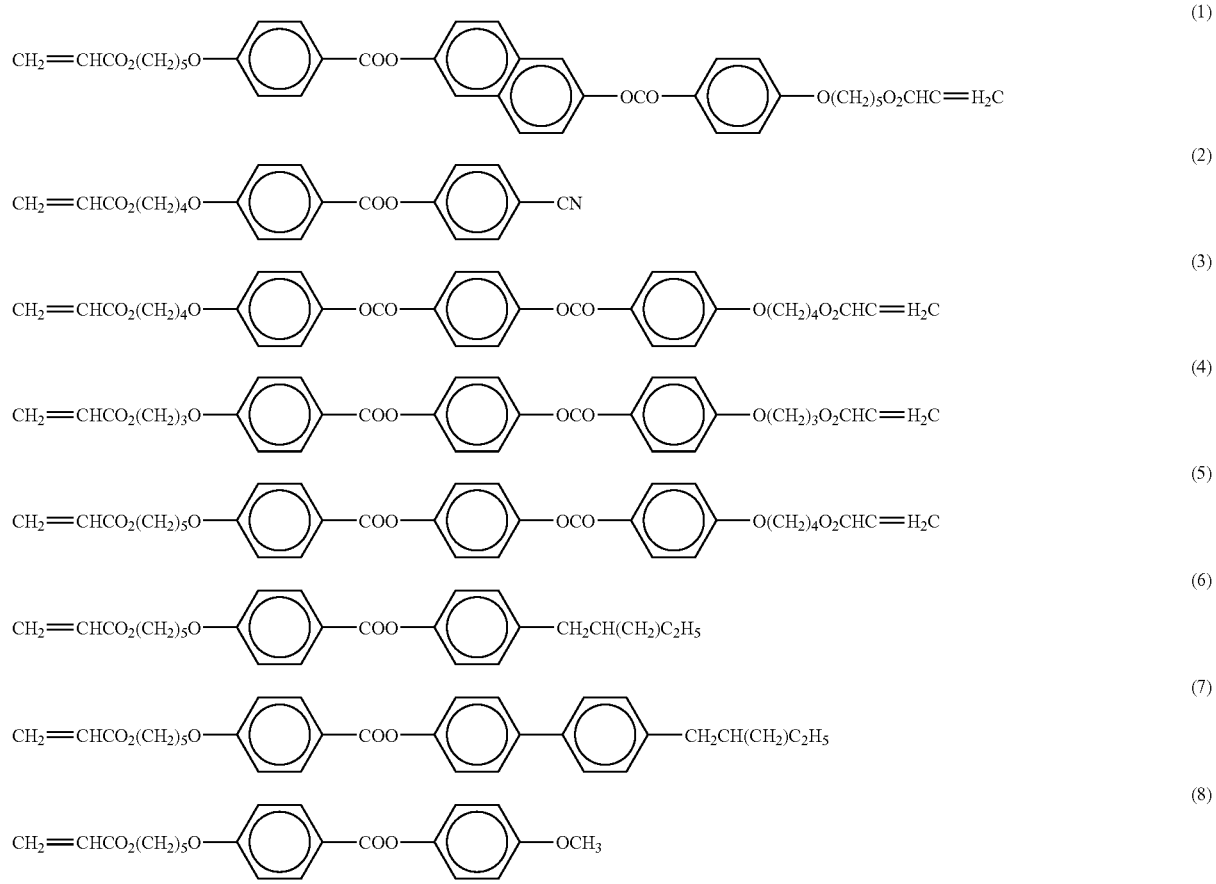

-continued

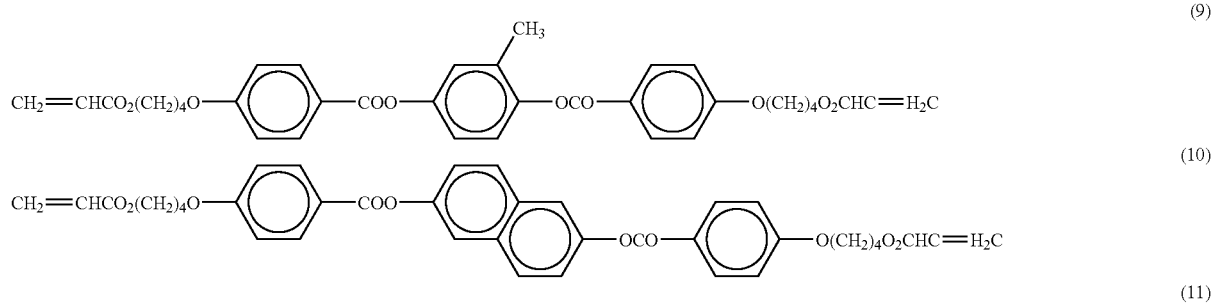

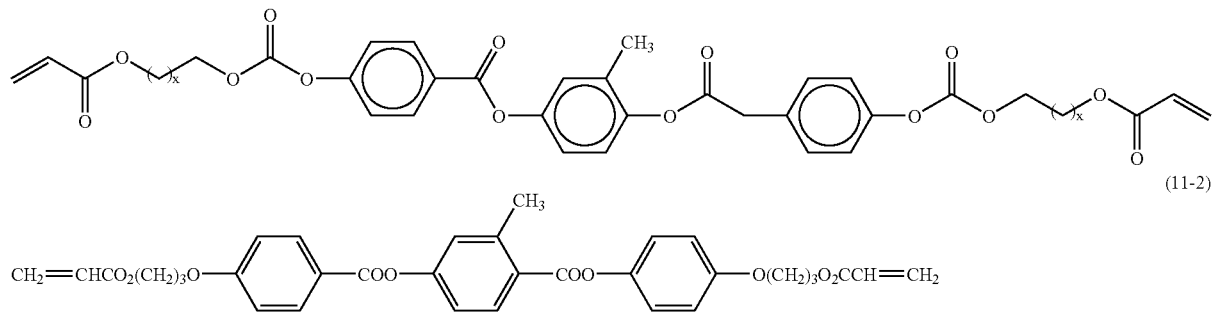

Those compounds represented by general chemical formulae (12) to (14) and (14-2), for example, can be used for the chiral agent. In chiral agents represented by general chemical formulae (12) and (13), X is preferably an integer of 2 to 12; and in chiral agents represented by general chemical formula (14), X is preferably an integer of 2 to 5. In general chemical formula (12), $R^4$ is hydrogen or methyl group.

On the other hand, it is desirable to use, as the three-dimensionally cross-linkable oligomers, cyclic organopolysiloxane compounds having cholesteric phases, etc. as disclosed in Japanese Laid-Open Patent Publication No. 165480/1982, for example.

The nematic liquid crystal constituting the λ/4 retardation layer has, because of its nematic-regular structure, double

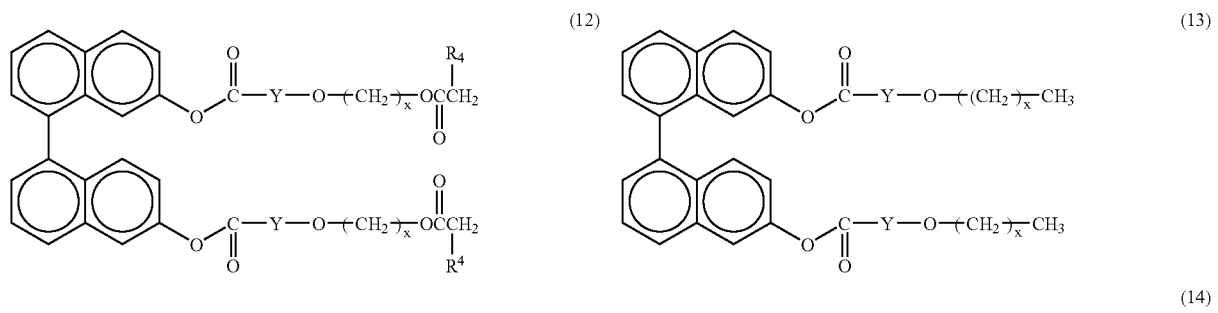

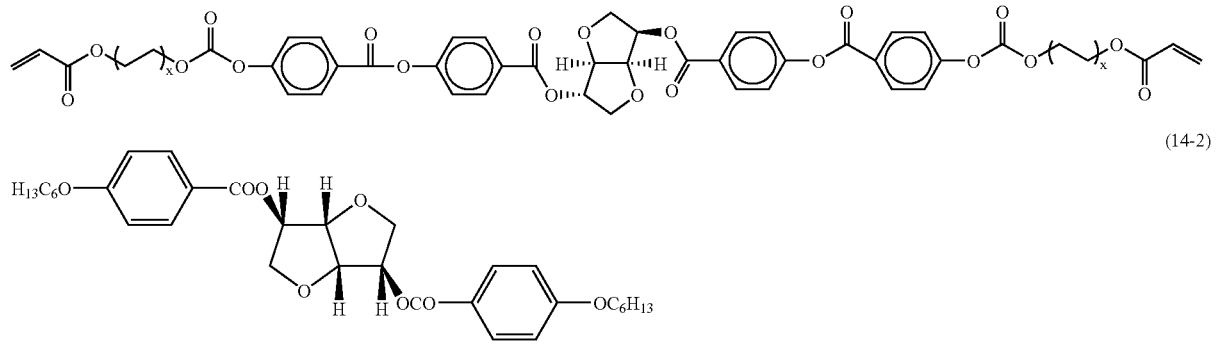

refractivity that makes the λ/4 retardation layer act as an A plate, so that its refraction index in the direction of directors of liquid crystalline molecules is different from that in the direction vertical to the directors. Namely, the λ/4 retardation layer 14 has an optical axis extending in the direction of plane, and if, in the three-dimensional rectangular coordinate system, the refractive indices of the λ/4 retardation layer 14 in the direction of plane are indicated by Nx and Ny and that in the direction of thickness is indicated by Nz, these indices are in the relationship Nx>Ny=Nz. Therefore, even in the direction of plane, the refractive index (e.g., Nx) in the direction of the directors of liquid crystalline molecules is different from that (e.g., Ny) in the direction vertical to the directors. It is noted that the refractive index (e.g., Ny) in the direction of plane, vertical to the directors, is equal to the refractive index Nz in the direction of thickness.

On the contrary, the cholesteric liquid crystal constituting the C plate-type retardation layer 16 has, because of its cholesteric-regular structure, double refractivity that makes the C plate-type retardation layer act as a negative C plate, so that its refractive index in the direction of thickness is different from those in the direction of plane. Namely, the C plate-type retardation layer 16 has an optical axis extending in the direction of plane, and if, in the three-dimensional rectangular coordinate system, the refractive indices of the C plate-type retardation layer in the direction of plane are indicated by Nx and Ny and that in the direction of thickness is indicated by Nz, these indices are in the relationship Nx=Ny>Nz. Therefore, the C plate-type retardation layer can shift the phase of circularly polarized light that passes through this retardation layer in the direction deviating from the normal to the laminated retardation optical element 10, thereby converting the circularly polarized light into elliptically polarized light, and, on the other hand, can shift the phase of elliptically polarized light that passes through this retardation layer in the direction deviating from the normal, thereby converting the elliptically polarized light into circularly polarized light. It is noted that the C plate-type retardation layer transmits circularly polarized light that passes through this retardation layer in the direction of the normal, without shifting its phase.

The laminated retardation optical element 10 according to this embodiment is composed of a combination of two retardation layers (the λ/4 retardation layer 14 that acts as an A plate and the C plate-type retardation layer 16 that acts as a negative C plate) that are directionally different in the state of double refraction. These retardation layers can cause different phase shifts, and, at the same time, can very effectively compensate, owing to their synergetic effects, for changes in optical properties (phase shift, etc.) that are caused by the liquid crystal cell 104.

Moreover, in the laminated retardation optical element 10, a cross-linked nematic liquid crystal is used as the main component of the λ/4 retardation layer 14, and a cross-linked chiral nematic liquid crystal (a cross-linked nematic liquid crystal and a cross-linked chiral agent) or cross-linked discotic liquid crystal, as the main component of the C plate-type retardation layer 16. Therefore, the laminated retardation optical element 10 can have strength, heat resistance and impact resistance that are satisfactorily high, and can thus be used even in a severe environment at 100° C. or higher. In addition, in the process of lamination, the λ/4 retardation layer 14 and the C plate-type retardation layer 16 never mingle with each other, so that it is possible to obtain excellent optical properties.

In the laminated retardation optical element 10, it is preferable that the thickness of the C plate-type retardation layer 16 comprising a chiral nematic liquid crystal be 5 μm or less.

This is because, if the C plate-type retardation layer 16 has a thickness of more than 5 μm, it tends to suffer from alignment defect.

Next, modifications of the laminated retardation optical element 10 shown in FIG. 3A will be described with reference to FIGS. 4A, 4B and 4C.

First of all, a laminated retardation optical element 10A shown in FIG. 4A will be described.

Figure 4A:
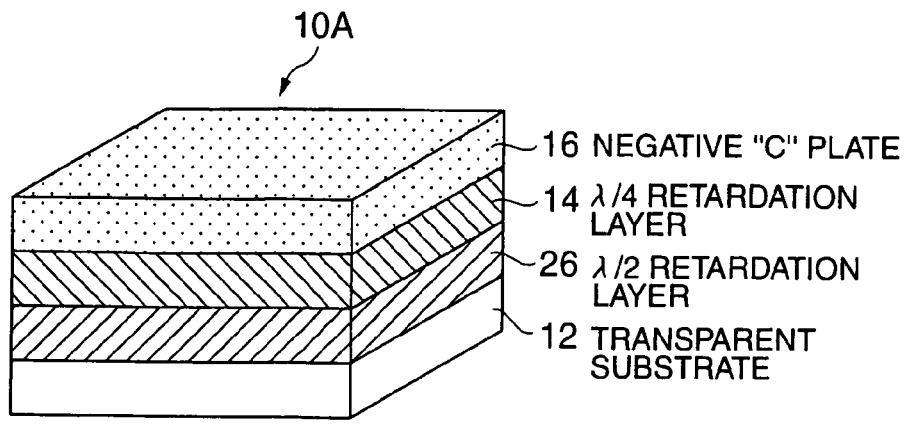
FIGS. 4A to 4C are enlarged, diagrammatic perspective views showing modifications of the laminated retardation optical element according to an embodiment of the present invention.

The laminated retardation optical element 10A shown in FIG. 4A further comprises, in addition to the above-described retardation layers 14 and 16, a λ/2 retardation layer 26 having the function of bringing, to light that passes through this retardation layer, a phase difference corresponding to a half of the wavelength of the light. This λ/2 retardation layer 26 is optically bonded to the surface of the λ/4 retardation layer 14 on the side opposite to the C plate-type retardation layer 16. The λ/4 retardation layer 14 has the function of converting linearly polarized incident light into circularly polarized light, or circularly polarized incident light into linearly polarized light. On the other hand, the λ/2 retardation layer 26 has the function of reversing the polarity of polarized light. The phase difference (retardation) to be brought by the λ/2 retardation layer 26 is properly designed according to the wavelength of the objective light. Specifically, for example, it is designed according to a wavelength freely selected from the visible wave range (400 to 800 nm) in consideration of spectral luminous efficacy and so on.

The λ/2 retardation layer 26 comprises as its main component a horizontally aligned, cross-linked nematic liquid crystal.

Figure 4B:
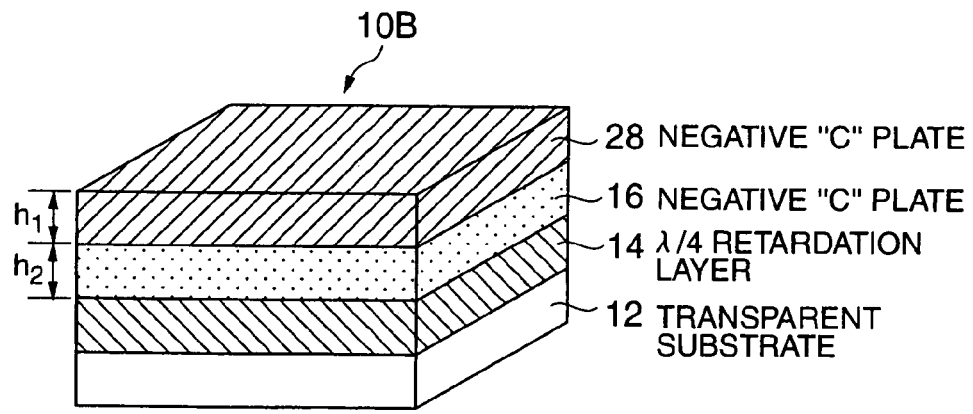
Figure 4C:
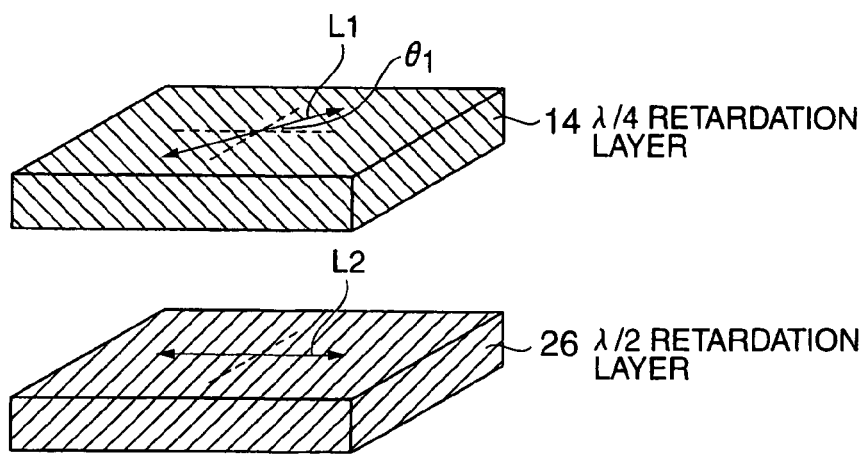

As shown in FIG. 4C, the λ/4 retardation layer 14 and the λ/2 retardation layer 26 are preferably such that the angle $\theta_1$ between the axis of phase advance $L_1$ of the λ/4 retardation layer 14 and the axis of phase advance $L_2$ of the λ/2 retardation layer 26 is 60±10 degrees. If this angle is so made, a laminate of the λ/4 retardation layer 14 and the λ/2 retardation layer 26 can constitute a λ/4 retardation layer that covers a wide wave range. Specific values for the angle $\theta_1$ between the axis of phase advance $L_1$ of the λ/4 retardation layer 14 and the axis of phase advance $L_2$ of the λ/2 retardation layer 26 can be selected from the desired wave range as described in Patent Document 6 previously listed. For example, in the case where the properties on the short wave side are placed above the others, 55±10 degrees is better for the above angle than 60±10 degrees.

Thus, according to the laminated retardation optical element 10A shown in FIG. 4A, the influence of the wavelength dispersion properties of the λ/4 retardation layer 14 is minimized by the λ/2 retardation layer 26 that is bonded to the λ/4 retardation layer 14 at a predetermined angle, and, as a result, a λ/4 retardation layer that covers a wide wave range can be obtained as a whole.

Next, a laminated retardation optical element 10B shown in FIG. 4B will be described.

The laminated retardation optical element 10B shown in FIG. 4B further comprises, in addition to the previously-mentioned two retardation layers, an additional C plate-type retardation layer 28 that acts as a negative C plate like the C plate-type retardation layer 16. This additional C plate-type retardation layer 28 is optically bonded to the surface of the C plate-type retardation layer 16 on the side opposite to the λ/4 retardation layer 14.

The additional C plate-type retardation layer 28 comprises as its main component a cross-linked chiral nematic liquid crystal (a cross-linked nematic liquid crystal and a cross-linked chiral agent) or cross-linked discotic liquid crystal, like the C plate-type retardation layer 16.

It is preferable that both the thickness h1 of the C plate-type retardation layer 16 and the thickness h2 of the additional C plate-type retardation layer 28 be 5 μm or less. This is because, if the thickness h1 of the C plate-type retardation layer 16 and the thickness h2 of the additional C plate-type retardation layer 28 are more than 5 μm, these two retardation layers tend to suffer alignment defect, and, in addition, the surface of the C plate-type retardation layer 16 to which the C plate-type retardation layer 28 is laminated has decreased alignment regulation power.

Further, the total thickness (h1+h2) of the C plate-type retardation layer 16 and the additional C plate-type retardation layer 28 is preferably 6 μm or more. If the total thickness is so made, there can be effectively obtained the effects of optical compensation provided by the C plate-type retardation layer 16 and the additional C plate-type retardation layer 28.

Furthermore, it is preferable that the thickness of the C plate-type retardation layer 16 be nearly equal to that of the additional C plate-type retardation layer 28. By controlling so, it becomes easy to produce the laminated retardation optical element 10, and the productivity can thus be increased.

Thus, according: to the laminated retardation optical element 10B shown in FIG. 4B, the total thickness of the C plate-type retardation layer 16 and the additional C plate-type retardation layer 28 can be made large with the thickness of each retardation layer maintained small, so that it is possible to effectively obtain the effects of optical compensation while preventing occurrence of alignment defect.

Figure 3B:
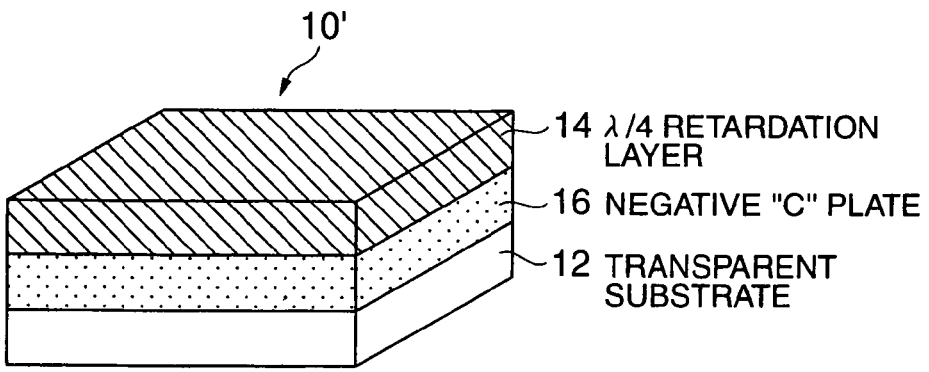

The laminated retardation optical element 10B shown in FIG. 4B is based on the laminated retardation optical element 10 shown in FIG. 3A. However, the additional C plate-type retardation layer 28 may also be provided similarly on the laminated retardation optical element 10' as shown in FIG. 3B or on the laminated retardation optical element 10A as shown in FIG. 4A.

Next, a laminated retardation optical element 20 shown in FIG. 5 will be described.

Figure 5:
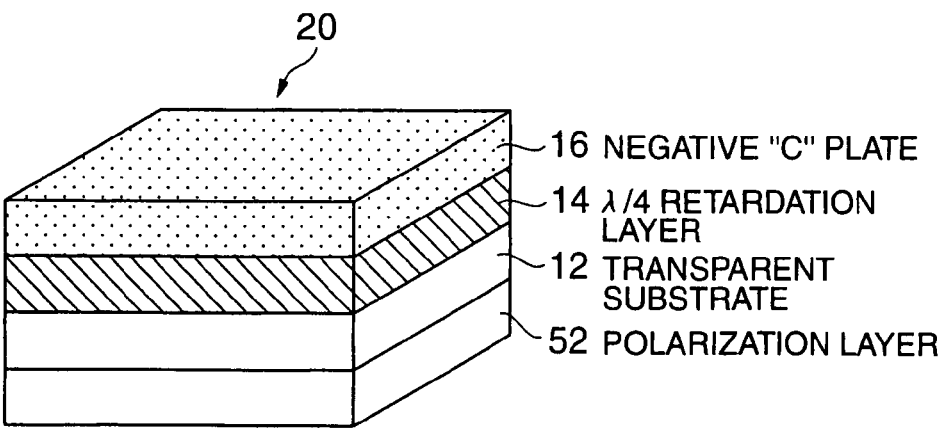
FIG. 5 is an enlarged, diagrammatic perspective view showing another modification of the laminated retardation optical element according to an embodiment of the present invention.

The laminated retardation optical element 20 shown in FIG. 5 comprises a polarization layer 52, such as a linear polarization layer, bonded to the surface of the transparent substrate 12 in the laminated retardation optical element 10 shown in FIG. 3A, on the side opposite to the λ/4 retardation layer 14. By so providing the polarization layer 52, it is possible to impart the desired property of polarizing light, such as the property of linearly polarizing light, to the laminated retardation optical element 20.

Figure 6A:
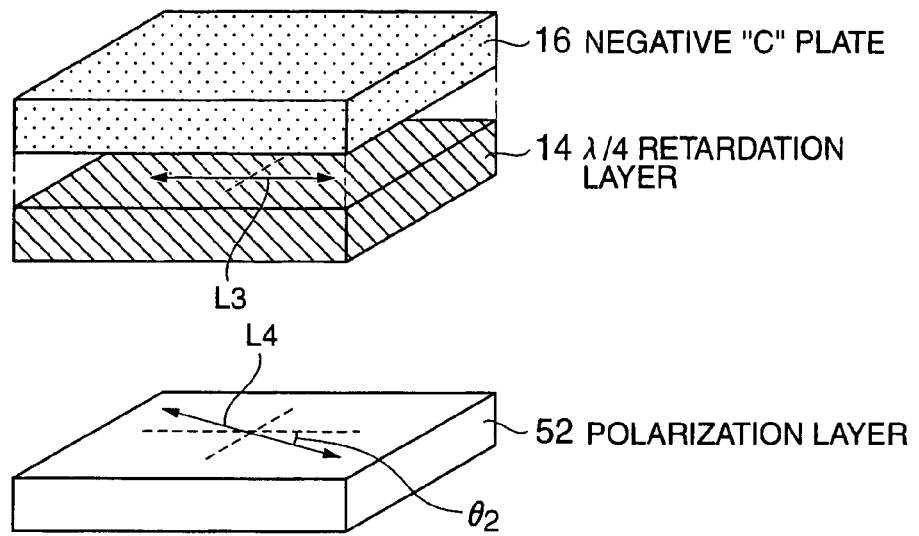
FIGS. 6A and 6B are diagrammatic views illustrating the relationship between the optical axes of the layers contained in the laminated retardation optical element shown in FIG. 5.

In such a laminated retardation optical element 20, the angle $\theta_2$ between the axis of phase advance $L_3$ of the λ/4 retardation layer 14 and the axis of transmission $L_4$ of the polarization layer 52 having the function of controlling the state of polarization of light that will pass through the λ/4 retardation layer 14 is preferably 45±2 degrees, as shown in FIG. 6A.

The laminated retardation optical element 20 shown in FIG. 5 is based on the laminated retardation optical element 10 as shown in FIG. 3A. The polarization layer 52 may also be provided similarly on the laminated retardation optical element 10' as shown in FIG. 3B or on the laminated retardation optical elements 10A and 10B as shown in FIGS. 4A and 4B, respectively.

Figure 6B:
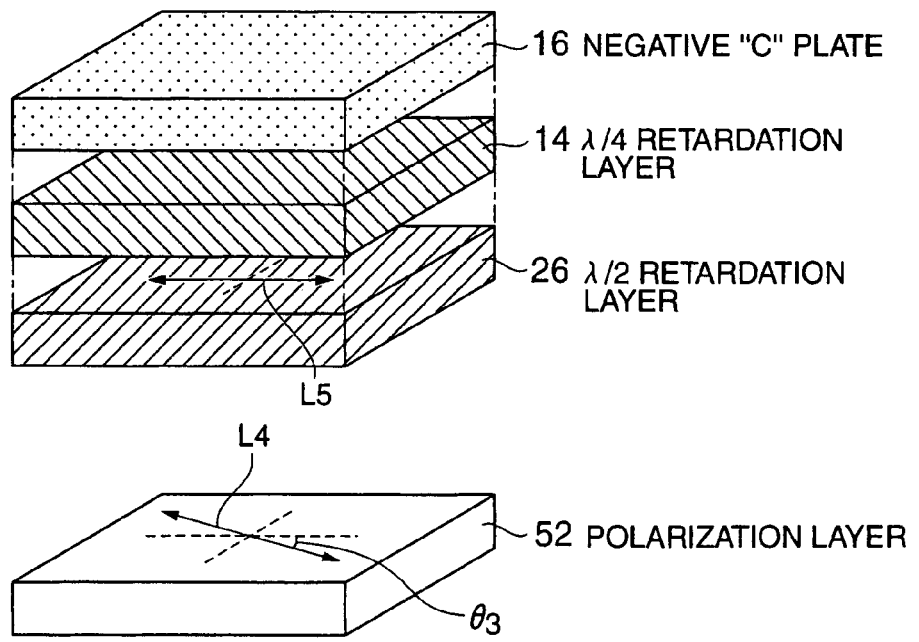

In the laminated retardation optical element 10A shown in FIG. 4A, if the polarization layer 52 is bonded to the surface of the transparent substrate 12 on the side opposite to the λ/2 retardation layer 26, the angle $\theta_3$ between the axis of phase advance $L_5$ of the λ/2 retardation layer 26 and the axis of transmission $L_4$ of the polarization layer 52 having the function of controlling the state of polarization of light that will pass through the λ/2 retardation layer 26 is preferably 15±5 degrees, as shown in FIG. 6B.

Next, laminated retardation optical elements 30A and 30B shown in FIGS. 7A and 7B, respectively, will be described.

In the laminated retardation optical elements 10, 10', 10A, 10B and 20 shown in FIGS. 3A, 3B, 4A, 4B and 5, respectively, the C plate-type retardation layer 16 that acts as a negative C plate is used as a retardation layer to be optically bonded to the λ/4 retardation layer 14 that acts as an A plate. However, in order to prevent light from slantingly leaking from the polarizers 102A and 102B that are arranged in the cross nicol disposition in the liquid crystal display 90 as shown in FIG. 1, a C plate-type retardation layer 16' that acts as a positive C plate may be used instead of the C plate-type retardation layer 16.

Figure 7A:
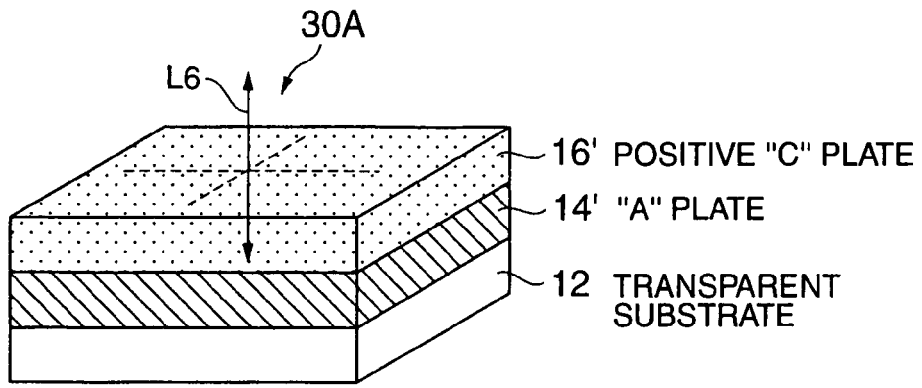
FIGS. 7A and 7B are enlarged, diagrammatic perspective views showing further modifications of the laminated retardation optical element according to an embodiment of the present invention.

Specifically, the laminated retardation optical element 30A shown in FIG. 7A comprises: an A plate-type retardation layer 14' that acts as an A plate; and a C plate-type retardation layer 16' that acts as a positive C plate. These two retardation layers are optically bonded to each other. The A plate-type retardation layer 14' comprises as its main component a horizontally aligned, cross-linked nematic liquid crystal, and, owing to its horizontally-aligned, nematic-regular structure, acts as an A plate having an optical axis (axis of phase delay) extending in the direction of plane (see the symbol $L_7$ in FIG. 7B). On the other hand, the C plate-type retardation layer 16' comprises as its main component a vertically aligned, cross-linked nematic liquid crystal, and; owing to its vertically-aligned, nematic-regular structure, acts as a positive C plate having an optical axis (axis of phase delay) extending in the direction of thickness (see the symbol $L_6$ in FIG. 7A). The C plate-type retardation optical layer 16' that acts as a positive C plate has an optical axis extending in the direction of thickness, and if, in the three-dimensional rectangular coordinate system, the refractive indices of the C plate-type retardation layer 16' in the direction of plane are indicated by Nx and Ny and that in the direction of thickness is indicated by Nz, these refractive indices are in the relationship Nx=Ny<Nz.

In the laminated retardation optical element 30A shown in FIG. 7A, the A plate-type retardation layer 14' and the C plate-type retardation layer 16' are laminated to the transparent substrate 12 in this order. However, as in the laminated retardation optical element 30B shown in FIG. 7B, it is also possible to laminate the C plate-type retardation layer 16' and the A plate-type retardation layer 14' to the transparent substrate 12 in this order.

Further, in the laminated retardation optical element 30A shown in FIG. 7A, the A plate-type retardation layer 14' to which the C plate-type retardation layer 16' is laminated may be any retardation layer as long as it can act as a (positive) A plate, and a variety of retardation layers, such as a λ/4 retardation layer having the function of bringing, to light that passes through this retardation layer, a phase difference corresponding to a quarter of the wavelength of the light, or a λ/2 retardation layer having the function of bringing, to light that passe through this retardation layer, a phase difference corresponding to a half of the wavelength of the light, can be used for the A plate-type retardation layer 14'. The phase difference (retardation) that is brought by the λ/4 retardation layer or the λ/2 retardation layer is properly designed according to the wavelength of the objective light. Specifically, for example, it is designed according to a wavelength that is freely selected from the visible wave range (400 to 800 nm) in consideration of spectral luminous efficacy and so on.

Figure 7B:
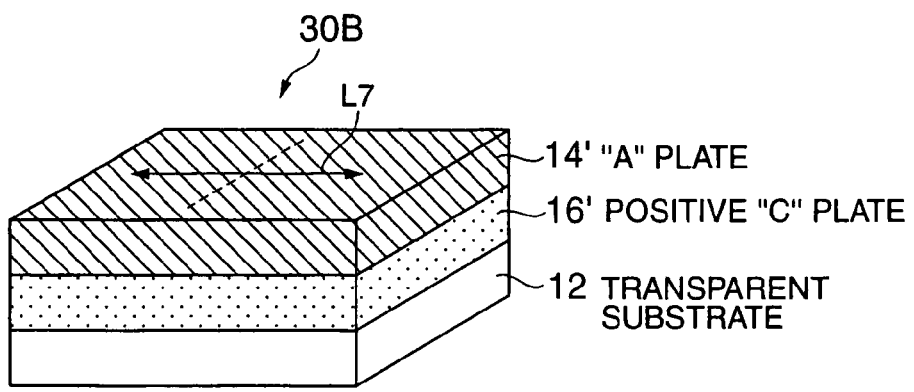

Thus, according to the laminated retardation optical elements 30A and 30B shown in FIGS. 7A and 7B, respectively, the C plate-type retardation layer 16' acting as a positive C plate is constructed as a mono-axial, birefringent layer that is aligned to have an optical axis (axis of phase delay) extending in the direction of thickness, and is optically bonded to the surface of the A plate-type retardation layer 14' acting as a (positive) A plate, so that if these laminated retardation optical elements are incorporated in liquid crystal displays 90 as shown in FIG. 1, it is possible to compensate, by the C plate-type retardation layer 16' and the A plate-type retardation layer 14', for the phase shift of light that enters from the direction deviating from the normal to the polarizers 102A and 102B arranged in the cross nicol disposition. For this reason, in the liquid crystal displays 90 in which the laminated retardation optical elements 30A and 30B are incorporated, light is prevented from leaking slantingly from the polarizers 102A and 102B; the liquid crystal displays 90 can thus have improved viewing angle characteristic.

Next, laminated retardation optical elements 40A, 40B and 40C shown in FIGS. 8A, 8B and 8C, respectively, will be described.

Figure 8A:
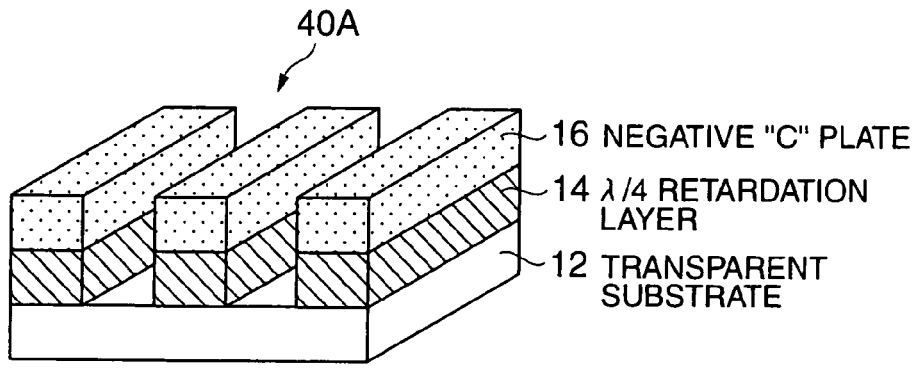
FIG. 8A to 8C are enlarged, diagrammatic perspective views showing still further modifications of the laminated retardation optical element according to an embodiment of the present invention.
Figure 8B:
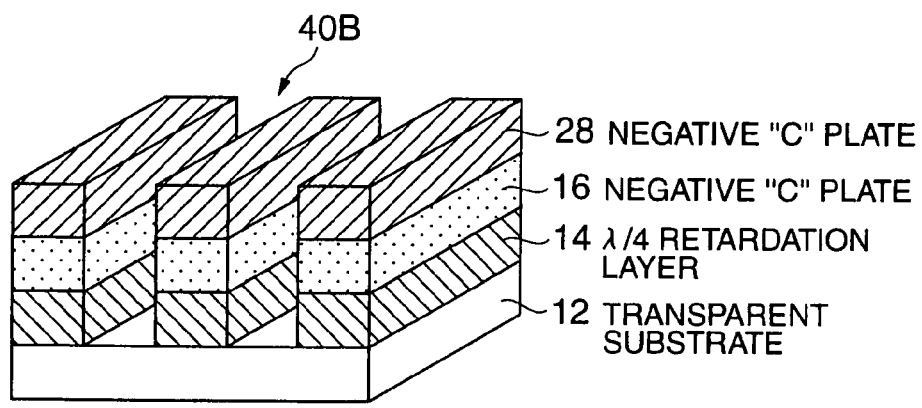
Figure 8C:
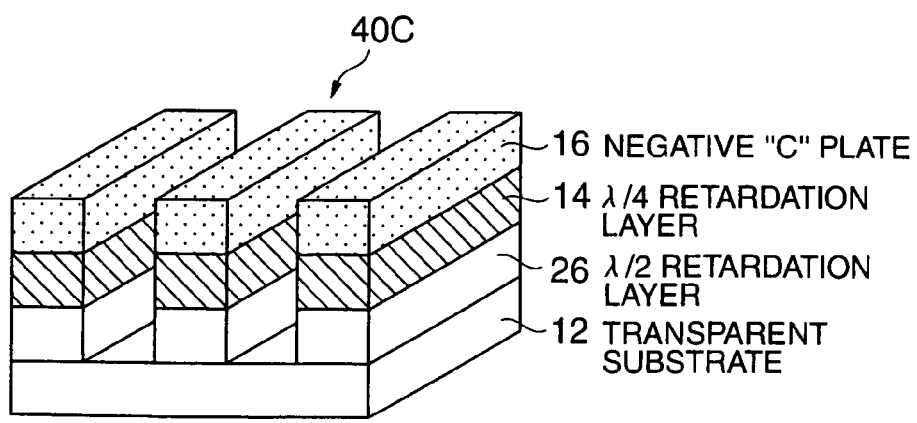

As shown in FIGS. 8A, 8B and 8C, the laminated retardation optical elements 40A, 40B and 40C are equivalent to such optical elements that the $\lambda/4$ retardation layer 14, the C plate-type retardation layers 16 and 28, and the $\lambda/2$ retardation layer 26 that are laminated to the transparent substrate 12 in the laminated retardation optical elements 10, 10', 10A and 10B as shown in FIGS. 3A, 3B, 4A and 4B, respectively, are subjected to patterning to make them into a predetermined pattern corresponding to the pixel area of the liquid crystal display 90.

In the liquid crystal display 90 in which the laminated retardation optical element 40A, 40B or 40C is incorporated, if the $\lambda/4$ retardation layer 14 or the $\lambda/2$ retardation layer 26 has been patterned as described above, circularly polarized light that enters the liquid crystal cell 104 which is driven by the application of an electric field can be made into at least two types of light, for example, right-handed circularly polarized light and left-handed circularly polarized light. Therefore, it becomes possible to obtain even a so-called three-dimensional display.

Further, by patterning the C plate-type retardation layers 16 and 28, it is possible to create at least two retardation areas that are different in viewing angle dependency. It thus becomes possible to provide a laminated retardation optical element suitable for the intended use.

In the laminated retardation optical elements 10, 10', 10A and 10B as shown in FIGS. 3A, 3B, 4A and 4B, respectively, in the laminated retardation optical elements 30A and 30B as shown in FIGS. 7A and 7B, respectively, and in the laminated retardation optical elements 40A, 40B and 40C as shown in FIGS. 8A, 8B, and 8C, respectively, it is preferable that the difference between the mean refractive indices of each two retardation layers bonded adjacently to each other (the $\lambda/4$ retardation layer 14, the C plate-type retardation layers 16, 16' and 28, and the $\lambda/2$ retardation layer 26) be 0.05 or less. If this difference is so made, it is possible to effectively prevent occurrence of interfacial reflection in the laminated retardation optical elements 10, 10A, 10B, 20, 30A, 30B, 40A, 40B and 40C and thus to effectively prevent lowering of contrast that usually occurs in a liquid crystal display 90 as shown in FIG. 1.

In this case, if the nematic liquid crystalline components contained in each two retardation layers bonded adjacently to each other (the $\lambda/4$ retardation layer 14, the C plate-type retardation layers 16, 16' and 28, and the $\lambda/2$ retardation layer 26) are made substantially the same, the above-described effects can be obtained more surely.

Next, a process of producing a laminated retardation optical element according to this embodiment, having the above-described construction, will be described with reference to the case where the laminated retardation optical element 10 shown in FIG. 3A is produced.

Figure 9:
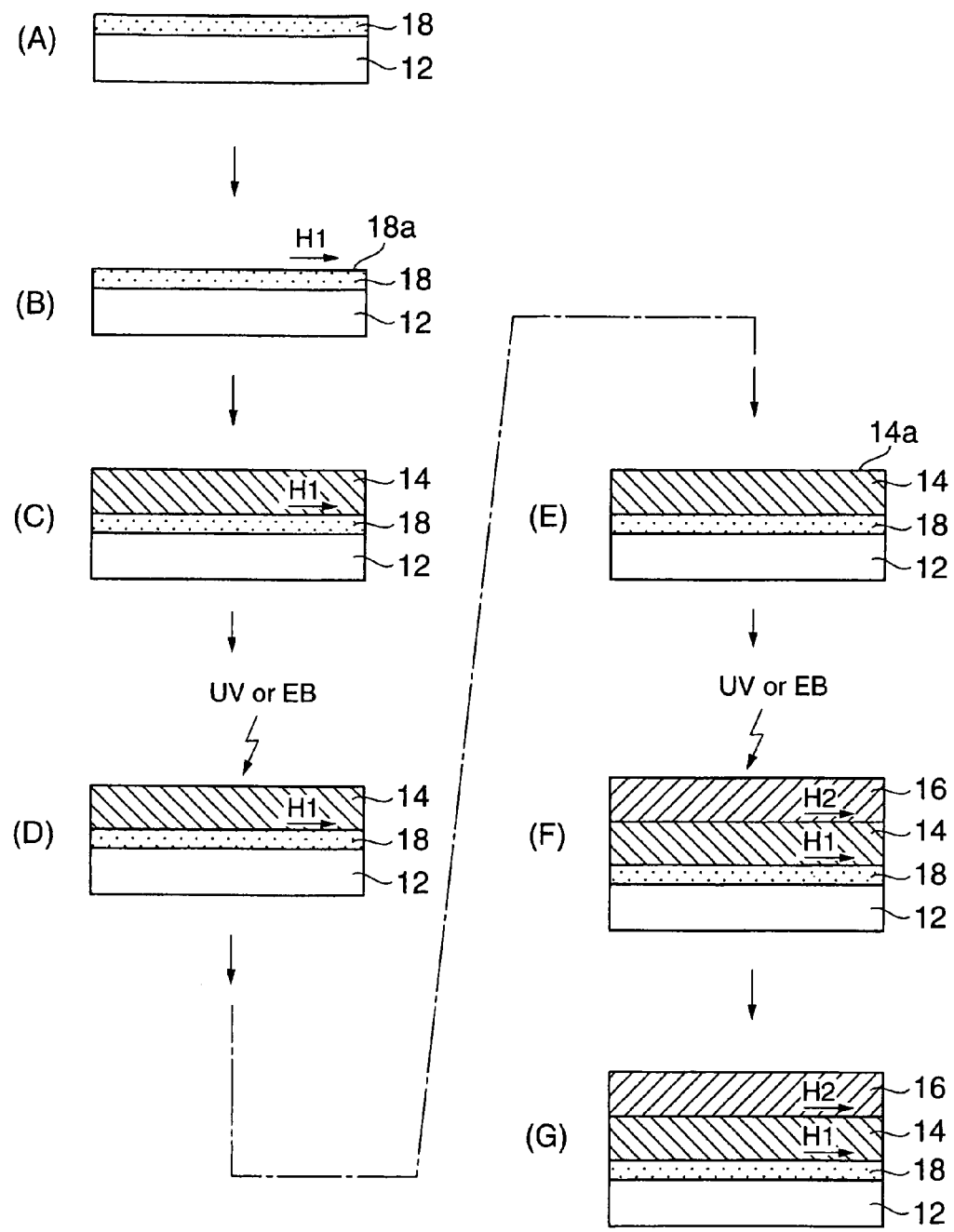
FIG. 9 is a diagrammatic view illustrating a process of producing a laminated retardation optical element according to an embodiment of the present invention.

First of all, an alignment layer 18 is formed on a transparent substrate 12 (FIG. 9 (A)). Inorganic materials such as plates of glass and silica, as well as a variety of resins including polyesters such as cellulose acetate, polyethylene terephthalate (PET) and polyethylene naphthalate (PEN), polyimide, and polyethylene can be used for the transparent substrate 12. The alignment layer 18 is laminated to the surface of the transparent substrate 12, and polymeric films of polyimide, polyamide imide, polyether imide, polyvinyl alcohol and the like can be used for this alignment layer 18.

The surface 18a of the alignment layer 18 thus formed is then subjected to rubbing treatment or the like for alignment (FIG. 9(B)). This surface 18a of the alignment layer 18 subjected to rubbing treatment or the like becomes such a state that those molecules existing in the vicinity of the surface 18a are aligned in almost one direction, and has fine grooves that are formed in one direction (the direction indicated by H1 in the figure), whereby liquid crystalline molecules that come in contact with this surface 18a are aligned.

Thereafter, a cross-linkable nematic liquid crystal made from a polymerizable monomer or oligomer, or the like is applied to the alignment layer 18 that has been subjected to rubbing treatment or the like (FIG. 9(C)). The polymerization of this polymerizable monomer or oligomer, or the like is initiated by the combination use of a photopolymerization initiator that has been added in advance and ultraviolet light that is externally applied, or directly initiated by using an electron beam, thereby three-dimensionally cross-linking (polymerizing) and solidifying the monomer or oligomer. There is thus formed a $\lambda/4$ retardation layer 14 in the form of a film, having the function of bringing, to light that passes through this retardation layer, a phase difference corresponding to a quarter of the wavelength of the light (FIG. 9(D)). In this process, liquid crystalline molecules in the $\lambda/4$ retardation layer 14 is aligned, in the direction indicated by H1 in the figure, by the alignment regulation power of the surface 18a of the alignment layer 18. If the entire surface 18a of the alignment layer 18 has been treated so that its alignment regulation power acts in substantially one direction, it is possible to make the directions of the directors of liquid crystalline molecules present on the surface of the $\lambda/4$ retardation layer that comes in contact with the surface 18a substantially the same within this surface. Since the retardation R brought by the $\lambda/4$ retardation layer 14 is given by the equation R=$\Delta n \cdot d$ ($\Delta n$: double refractive value, d: thickness), it is possible to control the retardation R by varying the thickness d of the $\lambda/4$ retardation layer 14. Specifically, for example, in the case where a $\lambda/4$ retardation layer 14 having a double refractive value $\Delta n$ of 0.1 is required to bring a retardation R of 100 nm, it is proper to make the thickness d of the $\lambda/4$ retardation layer 14, 1 μm.

Next, to the $\lambda/4$ retardation layer 14 thus formed, a cross-linkable chiral nematic liquid crystal (a cross-linkable nematic liquid crystal and a chiral agent) or discotic liquid crystal made from a polymerizable monomer or oligomer, or the like is applied (FIG. 9 (F)), and is then three-dimensionally cross-linked and solidified by the same technique as that used for forming the $\lambda/4$ retardation layer 14, thereby forming a C plate-type retardation layer 16 that is in the form of a film and acts as a negative C plate (FIG. 9 (G)). In this process, liquid crystalline molecules in the C plate-type retardation layer 16 are aligned, in the direction indicated by H2 in the figure, by the alignment regulation power of the surface 14a of the λ/4 retardation layer 14.

In order to decrease, for easy application, the viscosity of the polymerizable monomers or oligomers to be used to form the λ/4 retardation layer 14 and the C plate-type retardation layer 16, they may be dissolved in proper solvents such as toluene to give coating liquids. If such coating liquids are used, it is necessary to effect the drying step of evaporating the solvents before the step of three-dimensionally cross-linking the monomers or oligomers by the application of ultraviolet light or an electron beam.

Thus, there is readily obtained a laminated retardation optical element 10 in which the λ/4 retardation layer 14 and the C plate-type retardation layer 16 are optically bonded to each other. Moreover, since the alignment regulation power of the surface 14a of the λ/4 retardation layer 14 can be used to align the liquid crystalline molecules in the C plate-type retardation layer 16, it is possible to increase productivity.

In the case where the alignment regulation power of the surface 14a itself of the λ/4 retardation layer 14 is insufficient, the surface 14a of the λ/4 retardation layer 14 may be subjected to rubbing treatment to impart alignment regulation power to this surface.

Figure 10:
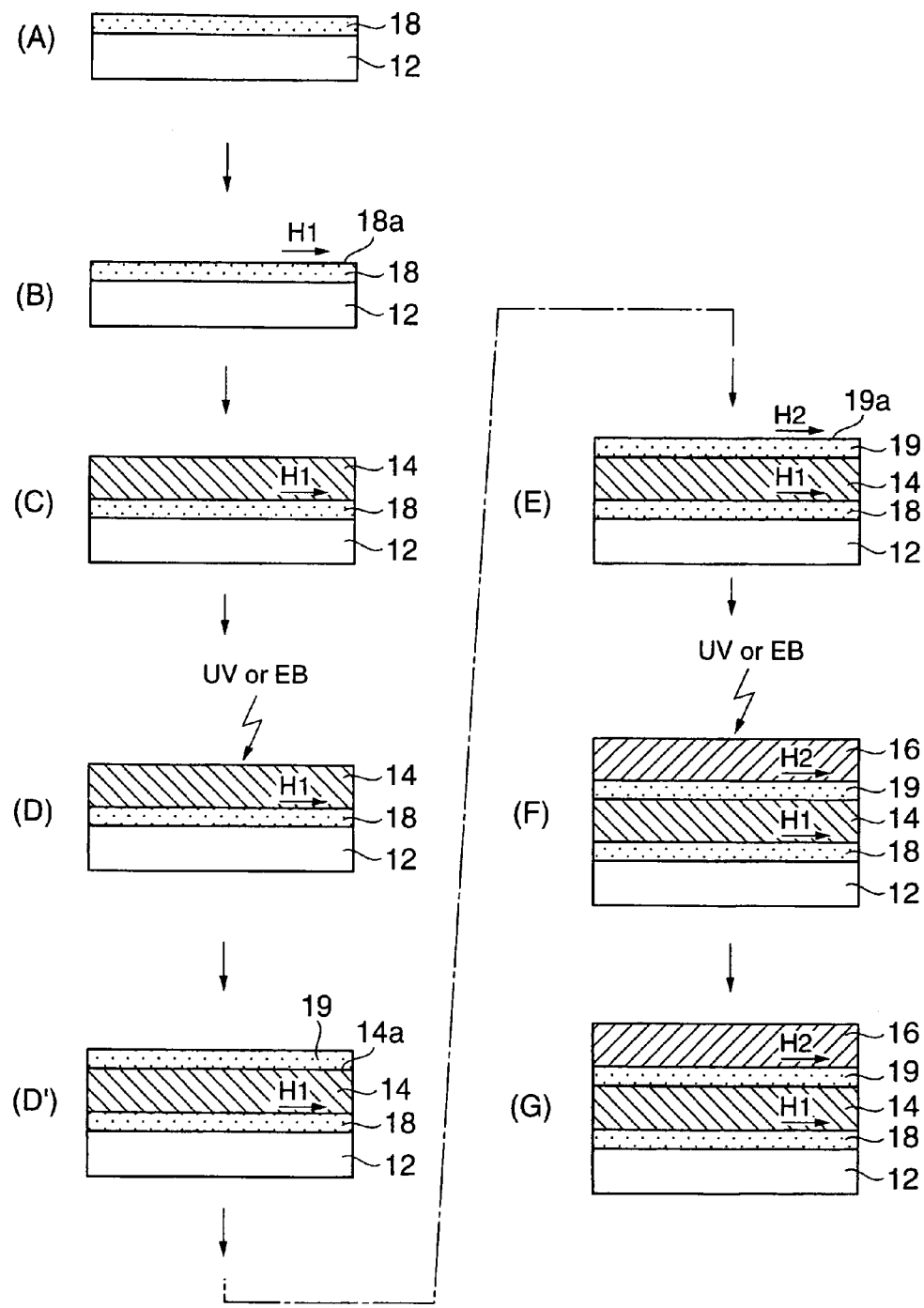
FIG. 10 is a diagrammatic view illustrating another process of producing a laminated retardation optical element according to an embodiment of the present invention.

The liquid crystalline molecules in the C plate-type retardation layer 16 may also be aligned in the following manner: as shown in FIGS. 10(D') to 10(G), after forming an alignment layer 19 on the surface 14a of the λ/4 retardation layer 14 (FIG. 10(D')), the surface 19a of this alignment layer 19 is subjected to rubbing treatment or the like to align it in the direction indicated by H2 in the figure, and the alignment regulation power of this surface 19a of the alignment layer 19 is used to align the liquid crystalline molecules in the C plate-type retardation layer 16 (FIGS. 10(E), 10(F) and 10(G)).

In the above description, the azimuth of the alignment regulation power of the surfaces 18a and 19a of the alignment layers 18 and 19 and that of the alignment regulation power of the surface 14a of the λ/4 retardation layer 14 are produced by means of rubbing treatment. The present invention, however, is not limited to this, and these azimuths may also be produced by means of optical alignment. The term "optical alignment" herein means that linearly polarized light or non-polarized slant light with a wavelength that causes photochemical reaction is applied to the surface of an optical alignment layer containing optically active molecules of azobenzene polymers, polyvinyl cinnamate, or the like, thereby imparting anisotropic properties to this surface. In this process, the longer axes of molecules present on the outermost surface of the optical alignment layer are aligned by the incident light, so that liquid crystalline molecules that come in contact with the molecules on the outermost surface are aligned.

In the above description, after firstly forming the λ/4 retardation layer 14 comprising a nematic liquid crystal on the alignment layer 18 formed on the transparent substrate 12, the C plate-type retardation layer 16 comprising a chiral nematic or discotic liquid crystal is formed on this λ/4 retardation layer 14. However, the present invention is not limited to this, and it is also possible to form, after firstly forming the C plate-type retardation layer 16 comprising a chiral nematic or discotic liquid crystal, the λ/4 retardation layer 14 comprising a nematic liquid crystal on this C plate-type retardation layer 16. In this case, since the nematic liquid crystal is applied directly to the C plate-type retardation layer 16, or applied to an alignment layer formed on the C plate-type retardation layer 16, it is solidified with the directions of the directors of liquid crystalline molecules present on the surface of the λ/4 retardation layer 14 on the C plate-type retardation layer 16 side regulated by the alignment regulation power of the surface of the C plate-type retardation layer 16 or of the alignment layer. The other procedures, conditions, etc. in this production process are basically the same as in the above-described production process, so that detailed descriptions for them are omitted.

Further, in the above description, the process of producing the laminated retardation optical element 10 shown in FIG. 3A is taken as an example. This process is also applicable to the production of the laminated retardation optical elements 10', 10A, 10B, 20, 30A, 30B, 40A, 40B and 40C shown in FIGS. 3B, 4A, 4B, 5, 7A, 7B, 8A, 8B and 8C, respectively.

Specifically, to produce, for example, the laminated retardation optical element 10A shown in FIG. 4A, a nematic liquid crystal is applied to an alignment layer formed on a transparent substrate 12 and is cross-linked to form a λ/2 retardation layer 26 in the form of a film, having the function of bringing, to light that passes through this retardation layer, a phase difference corresponding to a half of the wavelength of the light; and a nematic liquid crystal is then applied to the formed λ/2 retardation layer 26 and is cross-linked to form a λ/4 retardation layer 14 in the form of a film, having the function of bringing, to light that passes through this retardation layer, a phase difference corresponding to a quarter of the wavelength of the light. In this process, liquid crystalline molecules in the λ/4 retardation layer 14 are aligned by the alignment regulation power of the surface of the λ/2 retardation layer 26.

In the above process, if the alignment regulation power of the surface of the λ/2 retardation layer 26 is insufficient, the surface of the λ/2 retardation layer 26 may be subjected to rubbing treatment to impart alignment regulation power to this surface. Alternatively, after forming an alignment layer on the surface of the λ/2 retardation layer 26, the surface of this alignment layer is aligned by subjecting it to rubbing treatment or the like, and the alignment regulation power thus imparted to the surface of the alignment layer may be used to align liquid crystalline molecules in the λ/4 retardation layer 14. Although the azimuth of the alignment regulation power of the surface of the λ/2 retardation layer 26 is herein produced by means of rubbing treatment, it may also be produced by means of optical alignment.

To produce the laminated retardation optical element 10B shown in FIG. 4B, a chiral nematic liquid crystal (a cross-linkable nematic liquid crystal and a chiral agent) or discotic liquid crystal is applied to the above-formed C plate-type retardation layer 16, and is then three-dimensionally cross-linked and solidified to form a C plate-type retardation layer 28 that is in the form of a film and acts as a negative C plate.

It is possible to use the laminated retardation optical element 10 (10A, 10B, 20, 30A, 30B, 40A, 40B, 40C) according to the above-described embodiment by incorporating it in a liquid crystal display 90 as shown in FIG. 1.

In this case, a λ/4 retardation film (additional λ/4 retardation layer) 102C having the function of bringing, to light that passes through this retardation film, a phase difference corresponding to a quarter of the wavelength of the light is placed on a liquid crystal cell 104 on the side opposite to the laminated retardation optical element 10, as shown in FIG. 1. Further, a polarizer (additional polarization layer) 102B is placed on the λ/4 retardation film 102C on the side opposite to the liquid crystal cell 104. In addition, a λ/2 retardation film (additional λ/2 retardation layer) 102D having the function of bringing, to light that passes through this retardation film, a phase difference corresponding to a half of the wavelength of the light is placed, if necessary, on the λ/4 retardation film 102C on the side opposite to the liquid crystal cell 104 (between the λ/4 retardation film 102C and the polarizer 102B).

In the case where the λ/2 retardation film 102D is placed, the angle between the axis of phase advance of the λ/4 retardation film 102C and that of the λ/2 retardation film 102D is preferably 60±10 degrees. Specific values for the angle between the axis of phase advance of the λ/4 retardation film 102C and that of the λ/2 retardation film 102D can be selected from the desired wave range as described in Patent Document 6 as listed previously. For example, in the case where the properties on the short wave side are placed above the others, 55±10 degrees is better for the above angle than 60±10 degrees. Further, the angle between the axis of phase advance of the λ/4 retardation film 102C and the axis of transmission of the polarizer 102B is preferably 45±2 degrees. Furthermore, the angle between the axis of phase advance of the λ/2 retardation film 102D and the axis of transmission of the polarizer 102B is preferably 15±5 degrees.

In the above-described liquid crystal display 90, it is preferable that the angle between the axis of phase advance of the λ/4 retardation film 102C and that of the λ/4 retardation layer 14 contained in the laminated retardation optical element 10 be substantially equal to 90 degrees. Further, in the case where the λ/2 retardation film 102D is placed and the laminated retardation optical element 10A comprising the λ/2 retardation layer 26 as shown in FIG. 4A is used as the laminated retardation optical element 10, it is preferable that the angle between the axis of phase advance of the λ/2 retardation film 102D and that of the λ/2 retardation layer 26 contained in the laminated retardation optical element 10A be substantially equal to 90 degrees. If these angles are so controlled, incomplete circular polarization of light that has firstly passed through the λ/4 retardation layer 14 or λ/2 retardation layer 26 is cancelled by the subsequent λ/4 retardation film 102C or λ/2 retardation film 102D; it is therefore possible to increase contrast.

EXAMPLE

The aforementioned embodiments of the invention will now be explained more specifically by referring to the following Example, in which the production of the laminated retardation optical element 10 shown in FIG. 3A is taken as an example.

Example

A toluene solution (nematic liquid crystal solution) was prepared by dissolving a monomer containing, in its molecule, polymerizable acrylates at both ends and spacers between mesogen existing at the center and the acrylates, having a nematic-isotropic transition temperature of 110° C. (a monomer having a molecular structure represented by the above chemical formula (11)). To this nematic liquid crystal solution, a photopolymerization initiator ("Irgacure® 907" available from Ciba Specialty Chemicals K.K., Japan) was added in an amount of 5% by weight of the above-described monomer.

On the other hand, a transparent glass substrate was spin-coated with polyimide ("Optomer® AL1254" manufactured by JSR Corporation, Japan) dissolved in a solvent. After drying, a film of the polyimide (film thickness: 0.1 μm) was formed at 200° C., and was rubbed in one direction so that it could function as an alignment layer.

The glass substrate coated with the alignment layer was set in a spin-coater, and was spin-coated with the above-described nematic liquid crystal solution.

The toluene contained in the nematic liquid crystal solution was then evaporated at 80° C. to form a coating film. Ultraviolet light was applied to this coating film, and with radicals thus released from the photopolymerization initiator contained in the coating film, the acrylates in the monomer molecules were three-dimensionally crosslinked and solidified (polymerized) to give a layer (an A plate-type retardation layer acting as an A plate) in the form of a film, having a nematic-regular structure.

Next, a toluene solution (chiral nematic liquid crystal solution) was prepared by dissolving 90 parts of the above-described monomer (having the molecular structure represented by the above chemical formula (11)) and 10 parts of a chiral agent comprising acrylates at the both ends of its molecule (having the molecular structure represented by the above chemical formula (14)). The above A plate-type retardation layer was spin-coated with this chiral nematic liquid crystal solution.

The toluene contained in the chiral nematic liquid crystal solution was then evaporated at 80° C. to form a coating film. Ultraviolet light was applied to this coating film, and with radicals thus released from the photopolymerization initiator contained in the coating film, the acrylates in the monomer molecules were three-dimensionally crosslinked and solidified (polymerized) to give a layer (a C plate-type retardation layer acting as a negative C plate) in the form of a film, having a cholesteric-regular structure.

Thus, there was finally obtained a laminated retardation optical element in which the layer (an A plate-type retardation layer acting as an A plate) having a nematic-regular structure and the layer (a C plate-type retardation layer acting as a negative C plate) having a cholesteric-regular structure were adjacently laminated to each other.

In this Example, three different laminated retardation optical elements X, Y and Z were produced by varying the thickness of the A plate-type retardation layer and that of the C plate-type retardation layer. Namely, a laminated retardation optical element X with a total film thickness of 4 μm was produced, where the thickness of the A plate-type retardation layer was made 2 μm and that of the C plate-type retardation layer was made 2 μm. Further, a laminated retardation optical element Y with a total film thickness of 2.5 μm was produced, where the thickness of the A plate-type retardation layer was made 0.5 μm and that of the C plate-type retardation layer was made 2 μm. Furthermore, a laminated retardation optical element Z with a total film thickness of 3.2 μm was produced, where the thickness of the A plate-type retardation layer was made 1.2 μm and that of the C plate-type retardation layer was made 2 μm.

Comparative Example

A laminated retardation optical element of Comparative Example was produced by the combination use of an oriented, norbornene resin film acting as the λ/4 retardation layer and three TAC films acting as negative C plates, prepared by bonding the films with an adhesive agent.

(Results of Evaluation)

The effects, on optical compensation, of the laminated retardation optical elements X, Y and Z of Example produced in the above-described manner were evaluated. Specifically, the relationship between viewing angle and retardation was obtained by the use of an automatic double refractivity measuring apparatus ("KOBRA® 21ADH" manufactured by Oji Keisoku Kiki Kabushiki Kaisha, Japan).

Figure 11:
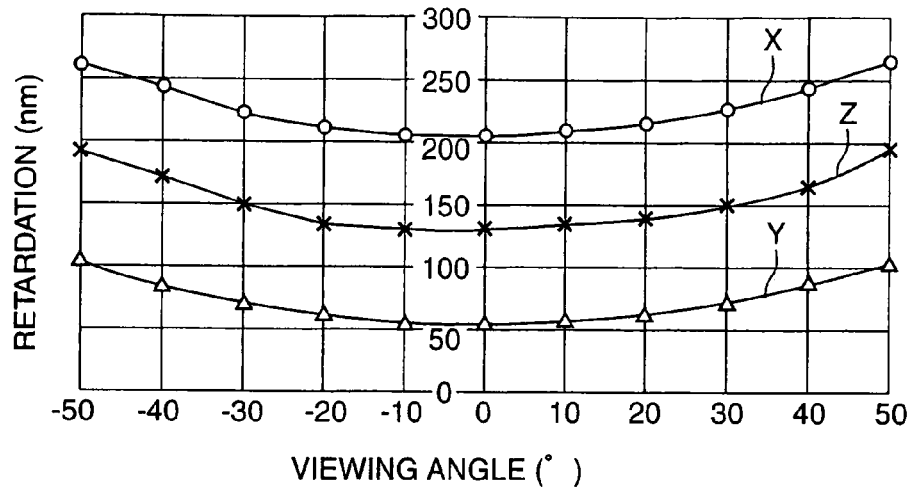
FIG. 11 is a graph showing the relationship between viewing angle and retardation in the laminated retardation optical elements of Example.
Figure 12:
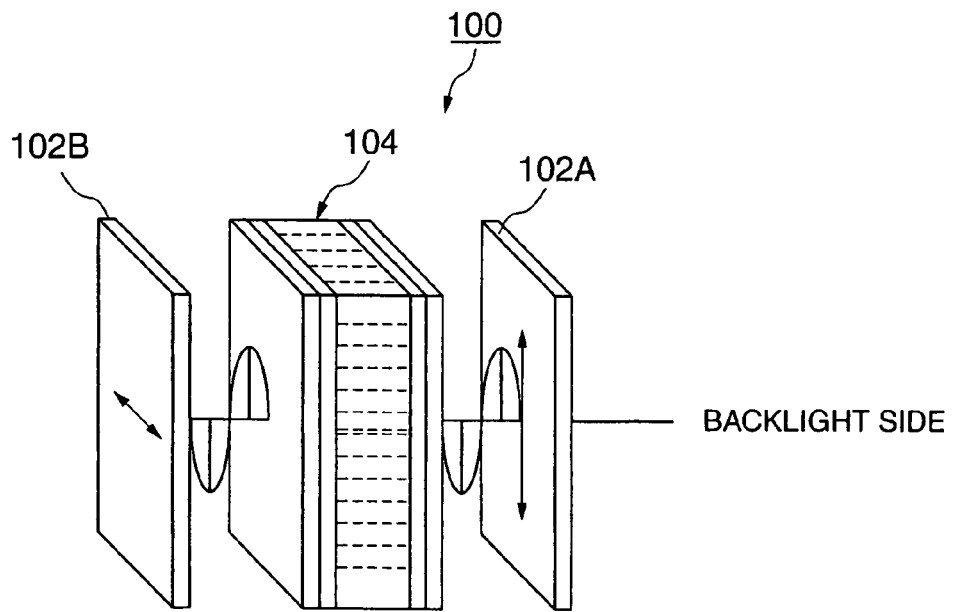
FIG. 12 is an exploded, diagrammatic perspective view showing a conventional liquid crystal display.

FIG. 11 is a graph showing the relationship between viewing angle and retardation in the laminated retardation optical elements X, Y and Z. FIG. 11 plots viewing angle (°) as the abscissa and retardation (nm) as the ordinate.

As is clear from FIG. 11, all of the laminated retardation optical elements X, Y and Z of Example have optical properties that are equal to the sum of the optical properties of the A plate and those of the C plate.

Further, the laminated retardation optical elements X, Y and Z of Example were respectively incorporated in liquid crystal displays as shown in FIG. 1, and contrast was observed. As a result, the contrast was found to be satisfactorily high as compared with the case where the laminated retardation optical element of Comparative Example was incorporated.

All of the laminated retardation optical elements X, Y and Z of Example were produced by laminating the C plate-type retardation layer to the A plate-type retardation layer by means of direct coating, so that there was no need to provide a transparent substrate or the like between these retardation layers. Thinning of laminated retardation optical elements was thus accomplished.

What is claimed is:

1. A liquid crystal display comprising:
   a liquid crystal cell of VA mode;
   a pair of polarizers between which the liquid crystal cell is sandwiched;
   a laminated retardation optical element placed between the liquid crystal cell and at least one of the polarizers, the laminated retardation optical element comprising:
     an A plate-type retardation layer that acts as an A plate; and
     a C plate-type retardation layer that is optically bonded to a surface of the A plate-type retardation layer and acts as a negative C plate, wherein the C plate-type retardation layer has a thickness of 5 μm or less;
   wherein:
     the C plate-type retardation layer comprises a cross-linked chiral nematic liquid crystal; and
     the A plate-type retardation layer is a λ/4 retardation layer having a function of bringing, to light that passes through this retardation layer, a phase difference corresponding to a quarter of a wavelength of the light;
     wherein the laminated retardation optical element is arranged so that the C plate-type retardation layer is situated on a side close to the liquid crystal cell;
   an additional λ/4 retardation layer having a function of bringing, to light that passes through this retardation layer, a phase difference corresponding to a quarter of a wavelength of the light, placed on the liquid crystal cell on a side opposite to the laminated retardation optical element; and
   an additional polarization layer having a function of controlling a state of polarization of light that passes through the additional λ/4 retardation layer, placed on the additional λ/4 retardation layer on a side opposite to the liquid crystal cell;
   wherein an angle between an axis of phase advance of the additional λ/4 retardation layer and an axis of transmission of the additional polarization layer is 45±2 degrees.

2. The liquid crystal display according to claim 1, the laminated retardation optical element further comprising a λ/2 retardation layer having a function of bringing, to light that passes through this retardation layer, a phase difference corresponding to a half of a wavelength of the light, the λ/2 retardation layer being optically bonded to a surface of the λ/4 retardation layer serving as the A plate-type retardation layer, on a side opposite to the C plate-type retardation layer.

3. The liquid crystal display according to claim 2, wherein the λ/2 retardation layer comprises a cross-linked nematic liquid crystal.

4. The liquid crystal display according to claim 2, wherein an angle between an axis of phase advance of the λ/4 retardation layer serving as the A plate-type retardation layer and that of the λ/2 retardation layer is 60±10 degrees.

5. The liquid crystal display according to claim 2, further comprising a polarization layer having a function of controlling a state of polarization of light that passes through the λ/2 retardation layer.

6. The liquid crystal display according to claim 5, wherein an angle between an axis of phase advance of the λ/2 retardation layer and an axis of transmission of the polarization layer is 15±5 degrees.

7. The liquid crystal display according to claim 1, the laminated retardation optical element further comprising an additional C plate-type retardation layer that is optically bonded to a surface of the C plate-type retardation layer on a side opposite to the A plate-type retardation layer and acts as a negative C plate,
   wherein the additional C plate-type retardation layer comprises a cross-linked chiral nematic or discotic liquid crystal, a total thickness of the C plate-type retardation layer and the additional C plate-type retardation layer is 6 μm or more, and a thickness of the C plate-type retardation layer is nearly equal to that of the additional C plate-type retardation layer.

8. The liquid crystal display according to claim 1, the laminated retardation optical element further comprising a polarization layer having a function of controlling a state of polarization of light that passes through the λ/4 retardation layer serving as the A plate-type retardation layer.

9. The liquid crystal display according to claim 8, wherein an angle between an axis of phase advance of the λ/4 retardation layer serving as the A plate-type retardation layer and an axis of transmission of the polarization layer is 45±2 degrees.

10. The liquid crystal display according to claim 1, wherein nematic liquid crystalline components contained in the retardation layers bonded adjacently to each other are substantially the same.

11. The liquid crystal display according to claim 1, wherein the A plate-type retardation layer is subjected to patterning to make it into a predetermined pattern.

12. The liquid crystal display according to claim 1, wherein the C plate-type retardation layer is subjected to patterning to make it into a predetermined pattern.

13. The liquid crystal display according to claim 1, wherein an angle between an axis of phase advance of the additional λ/4 retardation layer and that of the λ/4 retardation layer contained in the laminated retardation optical element is substantially equal to 90 degrees.

14. The liquid crystal display according to claim 1, wherein liquid crystalline molecules sealed in the liquid crystal cell are inclined in two or more different directions when an electric field is applied.

* * * * *